United States Patent
Jeong et al.

(10) Patent No.: US 12,490,215 B2
(45) Date of Patent: Dec. 2, 2025

(54) APPARATUS AND METHOD FOR SUPPORTING SYNCHRONIZATION OF RECONFIGURABLE INTELLIGENT SURFACE (RIS) REFLECTION PATTERN IN WIRELESS COMMUNICATION SYSTEM

(71) Applicant: Samsung Electronics Co., Ltd., Gyeonggi-do (KR)

(72) Inventors: Woojae Jeong, Gyeonggi-do (KR); Donggu Kim, Gyeonggi-do (KR); Seunghyun Lee, Gyeonggi-do (KR); Jungsoo Jung, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 316 days.

(21) Appl. No.: 18/476,788

(22) Filed: Sep. 28, 2023

(65) Prior Publication Data
US 2024/0137887 A1    Apr. 25, 2024

(30) Foreign Application Priority Data
Oct. 12, 2022    (KR) .......................... 10-2022-0130578

(51) Int. Cl.
*H04W 56/00*    (2009.01)
*H04B 7/04*    (2017.01)

(52) U.S. Cl.
CPC .... *H04W 56/0045* (2013.01); *H04B 7/04013* (2023.05)

(58) Field of Classification Search
CPC .............. H04W 56/0045; H04W 24/02; H04B 7/04013; H04B 7/145; H04J 13/0022; H04J 13/0062
See application file for complete search history.

(56) References Cited

U.S. PATENT DOCUMENTS

| | | | |
|---|---|---|---|
| 11,522,648 | B2 | 12/2022 | Kim et al. |
| 2022/0400462 | A1* | 12/2022 | Dai .......................... G01S 11/04 |
| 2023/0308139 | A1* | 9/2023 | Baligh ............... H04B 7/04013 |
| 2024/0356625 | A1* | 10/2024 | Walker ............... H04B 7/15528 |

FOREIGN PATENT DOCUMENTS

| | | |
|---|---|---|
| CN | 114584185 | 6/2022 |
| CN | 114785439 | 7/2022 |
| KR | 10-2192234 | 12/2020 |
| KR | 10-2023-0054065 | 4/2023 |
| WO | WO 2022/073161 | 4/2022 |
| WO | WO 2022/151016 | 7/2022 |

* cited by examiner

*Primary Examiner* — Ashley Shivers
(74) *Attorney, Agent, or Firm* — The Farrell Law Firm, P.C.

(57) ABSTRACT

The present disclosure relates to a fifth generation (5G) communication system or a sixth generation (6G) communication system for supporting higher data rates beyond a 4G communication system such as long term evolution (LTE). In a wireless communication system, a method performed by a base station includes identifying a delay time caused by a radio unit (RU) buffer, determining an RIS offset value for synchronization of signals transmitted to a reconfigurable intelligent surface (RIS), based on the delay time caused by the RU buffer, transmitting, to the RIS, a first signal to be transmitted to a terminal through a reflection plane of the RIS at a first time point, and transmitting, to the RIS, a second signal for controlling a reflection pattern of the RIS at a second time point to which the RIS offset value is applied.

20 Claims, 16 Drawing Sheets

APPARATUS AND METHOD FOR SUPPORTING SYNCHRONIZATION OF RECONFIGURABLE INTELLIGENT SURFACE (RIS) REFLECTION PATTERN IN WIRELESS COMMUNICATION SYSTEM

CROSS-REFERENCE TO RELATED APPLICATIONS

This application is based on and claims priority under 35 U.S.C. § 119 to Korean Patent Application No. 10-2022-0130578, filed on Oct. 12, 2022, in the Korean Intellectual Property Office, the disclosure of which is incorporated herein by reference in its entirety.

BACKGROUND

1. Field

The disclosure relates generally to a wireless communication system and, more specifically, to an apparatus and a method for transmitting or receiving a signal to support synchronization of a RIS reflection pattern in the wireless communication system.

2. Description of Related Art

Considering the continual development of wireless communication, technologies have been developed for services targeting humans, such as voice calls, multimedia services, and data services. Following the commercialization of 5th generation (5G) communication systems, it is expected that the number of devices that will be connected to communication networks will exponentially increase. Examples of connected devices may include vehicles, robots, drones, home appliances, displays, smart sensors connected to various infrastructures, construction machines, and factory equipment.

Mobile devices are expected to evolve in various form-factors, such as augmented reality glasses, virtual reality headsets, and hologram devices. In order to provide various services by connecting hundreds of billions of devices and things in a 6th generation (6G) era, there have been ongoing efforts to develop improved 6G communication systems, also referred to as beyond-5G systems.

6G communication systems, which are expected to be commercialized around 2030, will have a peak data rate of a tera (1,000 giga)-level bit per second (bps) and a radio latency less than 100 microseconds (usec), and thus will be 50 times as fast as 5G communication systems and have the $\frac{1}{10}$ radio latency.

In order to accomplish such a high data rate and an ultra-low latency, it has been considered to implement 6G communication systems in a terahertz (THz) band, such as 95 gigahertz (GHz) to 3 THz bands. It is expected that, due to severe path loss and atmospheric absorption in the THz bands than those in the millimeter wave (mmWave) bands introduced in 5G, technologies capable of securing the signal transmission distance will become more crucial. It is necessary to develop, as major technologies for securing the coverage, radio frequency (RF) elements, antennas, novel waveforms having a better coverage than orthogonal frequency division multiplexing (OFDM), beamforming and massive multiple-input multiple-output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and RIS.

To improve the spectral efficiency and the overall network performances, the following technologies have been developed for 6G communication systems: a full-duplex technology for enabling an uplink transmission and a downlink transmission to simultaneously use the same frequency resource, a network technology for utilizing satellites, high-altitude platform stations (HAPS), and the like in an integrated manner, an improved network structure for supporting mobile base stations and the like and enabling network operation optimization and automation and the like, a dynamic spectrum sharing technology via collision avoidance based on a prediction of spectrum usage, an use of artificial intelligence (AI) in wireless communication for improvement of overall network operation by utilizing AI from a designing phase for developing 6G and internalizing end-to-end AI support functions, and a next-generation distributed computing technology for overcoming the limit of UE computing ability through reachable super-high-performance communication and computing resources, such as mobile edge computing (MEC) and clouds over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will enable the next hyper-connected experience to be realized. Particularly, it is expected that services such as truly immersive extended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In a wireless communication system, a base station may transmit a RIS control signal to an RIS controller (RC) to adaptively adjust an RIS reflection pattern. More specifically, methods for transmitting an RIS control signal to an RC to generate an RIS reflection pattern corresponding to a signal to be transmitted by a base station to an RIS reflection plane have been considered.

A base station may transmit a data signal and a control signal to the RIS at the same time point. The RIS having received the control signal from the base station may control the RIS reflection plane based on the control signal received from the base station. For the sake of efficiency, the RC should control the RIS reflection plane to generate an optimal phase or amplitude for beamforming corresponding to each signal to be transmitted to the terminal by the base station through the RIS reflection plane. In this case, the RC should be able to control the RIS reflection plane to generate the beam pattern suitable for each data signal in accordance with the time point at which the data signal reaches the RIS reflection plane. However, transmission paths of the control signal transmitted to the RC and the data signal transmitted to the RIS reflection plane from the base station may differ, or a predetermined time delay may occur before the beam pattern is switched on the RIS reflection plane after the RC receives the control signal. Even when the base station transmits the control signal and the data signal at the same time point, a beam pattern suitable for the data signal may not be switched at an appropriate time point.

Accordingly, in order to apply a desired RIS reflection pattern to the data signal transmitted to the RIS by the base station, there is a need in the art for a method for synchronizing the timing controlling the RIS reflection plane with the data signal transmitted to the RIS reflection plane.

SUMMARY

The disclosure has been made to address at least the above-mentioned problems and/or disadvantages and to provide at least the advantages described below.

Accordingly, an aspect of the disclosure is to provide an apparatus and a method which may provide an effective service in a wireless communication system.

Another aspect of the disclosure is to provide an apparatus and a method for transmitting an RIS control signal to an RC to generate an RIS reflection pattern corresponding to a signal to be transmitted by a base station to an RIS reflection plane.

In accordance with an aspect of the disclosure, in a wireless communication system, a method performed by a base station includes identifying a delay time caused by a radio unit (RU) buffer, determining an RIS offset value for synchronization of signals transmitted to an RIS, based on the delay time caused by the RU buffer, transmitting, to the RIS, a first signal to be transmitted to a terminal through a reflection plane of the RIS at a first time point, and transmitting, to the RIS, a second signal for controlling a reflection pattern of the RIS at a second time point to which the RIS offset value is applied.

In accordance with an aspect of the disclosure, in a wireless communication system, a base station includes at least one transceiver and at least one processor functionally connected to the at least one transceiver, wherein the at least one processor is configured to identify a delay time caused by an RU buffer, determine an RIS offset value for synchronization of signals transmitted to a RIS, based on the delay time caused by the RU buffer, transmit, to the RIS, a first signal to be transmitted to a terminal through a reflection plane of the RIS at a first time point, and transmit, to the RIS, a second signal for controlling a reflection pattern of the RIS at a second time point to which the RIS offset value is applied.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The following description with reference to the accompanying drawings is provided to assist in a comprehensive understanding of embodiments of the present disclosure. Accordingly, those of ordinary skill in the art will recognize that various changes and modifications of the embodiments described herein can be made without departing from the scope and spirit of the present disclosure. Descriptions of well-known functions and constructions may be omitted for the sake of clarity and conciseness.

The terms used in the disclosure are only used to describe specific embodiments and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, embodiments will be described based on an approach of hardware but may include a technology that uses both hardware and software. Thus, the embodiments may not exclude the perspective of software.

In the following description, terms referring to device elements (e.g., control unit, processor, and reflection element (RE)), devices (e.g., RIS), data (e.g., signal, feedback, report, reporting, information, parameter, value, bit, and codeword), and concepts of wireless communication (e.g., channel, artificial channel, reflection pattern, and beam) are illustratively used for the sake of descriptive convenience. Therefore, the disclosure is not limited by the terms used below, and other terms having equivalent technical meanings may be used.

Herein, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

In the disclosure, various embodiments will be described using terms employed in some communication standards such as the 3rd generation partnership project (3GPP), but they are only for the sake of illustration. The embodiments may also be applied to other communication systems through modifications.

Figure 1:
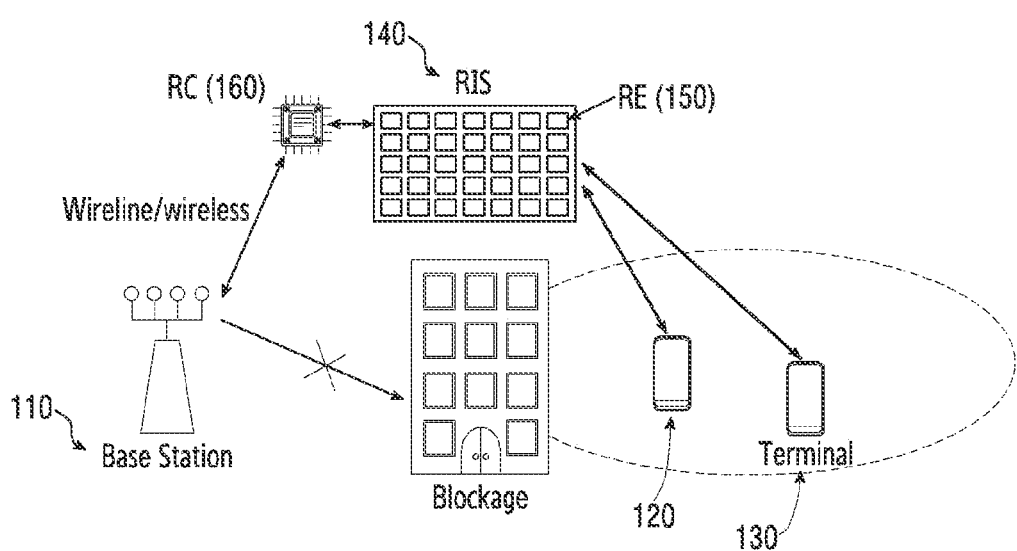
FIG. 1 illustrates an example of a wireless communication system including a RIS according to an embodiment.

FIG. 1 illustrates an example of a wireless communication system including a RIS according to an embodiment. More specifically, FIG. 1 illustrates a base station 110, a terminal 120, a terminal 130, and a RIS 140 as a part of nodes using a wireless channel in a wireless communication system. Although FIG. 1 illustrates only one base station and one RIS, other base stations and RISs identical to or similar to the base station 110 and the RIS 140 may be further included.

Referring to FIG. 1, the base station 110 corresponds to a network infrastructure for providing wireless access to the terminal 120 or 130 and has a coverage defined as a predetermined geographic area based on a distance within which a signal may be transmitted. The base station 110 may be referred to as an access point (AP), an eNodeB (eNB), a 5G node, a 6G node, a wireless point, a transmission/reception point (TRP), or another term having an equivalent technical meaning, in addition to a base station.

Each of the terminal 120 and the terminal 130 is a device used by a user and performs communication with the base station 110 through a wireless channel. In some cases, at least one of the terminal 120 and the terminal 130 may be operated without involvement of a user. That is, at least one of the terminal 120 and the terminal 130 is a device for performing machine type communication (MTC), and may not be carried by the user. The terminal 120 and the terminal 130 each may be referred to as a user equipment (UE), a mobile station, a subscriber station, a customer-premises equipment (CPE), a remote terminal, a wireless terminal, an electronic device, a user device, or another term having a technical meaning equivalent thereto, in addition to a terminal.

The base station 110, the terminal 120, and the terminal 130 may transmit and receive radio signals in mmWave bands (e.g., 28 GHz, 30 GHz, 38 GHz, 60 GHz, and over 60 GHz). In this case, in order to improve the channel gain, the base station 110, the terminal 120, and the terminal 130 may perform beamforming including transmission beamforming and reception beamforming That is, the base station 110, the terminal 120, and the terminal 130 may assign directivity to a transmission signal or a reception signal. To this end, the base station 110 and the terminals 120 and 130 may select serving beams 112, 113, 121, and 131 through a beam search or beam management procedure. After the serving beams 112, 113, 121, and 131 are selected, communication may be performed through a resource having a quasi-co-located (QCL) relationship with a resource transmitting the serving beams 112, 113, 121, and 131.

In case that a specific terminal 130 has a difficulty in directly receiving a wireless signal from the base station 110 due to an obstacle (e.g., a tree or a building) (e.g., the terminal is positioned at a radio shadow area), the terminal 130 may indirectly receive the signal transmitted from the base station 110 by means of reflection through the RIS 140. That is, the terminal 130 may receive a reflection signal reflected by the RIS 140. The RIS 140 may be referred to as a device including multiple reflection elements (REs) 150. The RIS 140 may include multiple REs 150 and an RC 160. The RIS 140 may be connected to the base station 110. For example, the RIS 140 may be wiredly or wirelessly connected to the base station 110 RC or to the RC 160 included in the RIS 140 and may transmit a control signal so that the RC may control an RIS reflection pattern by using an RE 150.

Each RE 150 of the RIS 140 may adjust a phase and amplitude of a signal to reflect. For example, based on each RE 150, the RIS 140 may adjust the phase and amplitude of the signal received from the base station 110 by a specific value. In this case, a combination of the phase and amplitude of the signal to be adjusted may be referred to as a reflection pattern. That is, based on the reflection pattern, the RIS 140 may adjust the phase or amplitude of the signal received from the base station 110. The RC 160 having received the control signal from the base station may control the reflection pattern of the RIS.

The RIS 140 may be operated based on multiple reflection patterns. For example, a first reflection pattern among multiple reflection patterns may be applied to multiple REs 150 included in the RIS 140. The RIS 140 to which the first reflection pattern is applied may reflect a signal received from the base station 110 as a signal having a first reflection characteristic which indicates either changing the characteristic of the received signal and reflecting the signal as it is or generating and transmitting a new signal based on the characteristic of the received signal and the reflection pattern (reflection phase and reflection amplitude) desired to be adjusted. In case that, among multiple reflection patterns, a second reflection pattern different from the first reflection pattern is applied to the RIS 140, the second reflection pattern may be applied to multiple REs 150 included in the RIS 140. In this case, the RIS 140 may reflect a signal reflected by the first reflection pattern and a signal having a different characteristic. That is, the RIS 140 to which the second reflection pattern is applied may reflect as a signal having the second reflection characteristic. Multiple reflection patterns may be included in one RIS beambook.

In order to reflect a signal received from the base station 110 and transmit the signal to the terminal 120, the RIS 140 may determine a specific reflection pattern and a time (hereinafter, a reflection pattern period) during which a specific reflection pattern is maintained. The reflection pattern and the reflection pattern period of the RIS 140 may be configured by the base station 110. For example, the RIS 140 may receive configuration information from the base station 110 and determine the reflection pattern and the reflection pattern period based thereon. In addition, the RIS 140 may determine the reflection pattern and the reflection pattern period based on information of a line (wired connection) connected from the base station 110. In this case, determining the reflection pattern may indicate that one of reflection patterns of a specific RIS beambook is selected and used to reflect the signal.

As described above, the terminal 130, which may not directly receive a signal from the base station 110 due to an obstacle, may maintain communication by receiving a signal reflected by the RIS 140. The RC 160 may determine the reflection pattern of the RIS based on a control signal received from the base station. For efficient signal transmission and reception in consideration of beam direction or beamforming, an optimum reflection pattern corresponding to a reflected signal needs to be applied at a time point at which the signal to be transmitted to the terminal by the base station is reflected on the RIS. A time point at which the RIS receives, from the base station, a signal to be reflected and a time point at which a control signal is received to determine the reflection pattern may have a difference due to various factors including delay time, and thus a synchronization method for optimizing reception time points of signals may be discussed.

Figure 2:
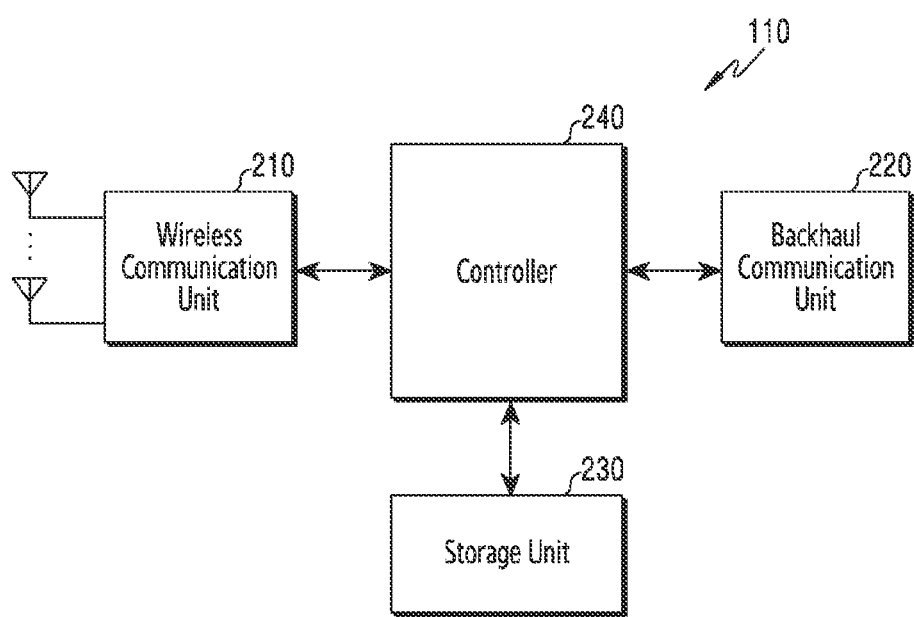
FIG. 2 illustrates a functional configuration of a base station in a wireless communication system according to an embodiment.

FIG. 2 illustrates a functional configuration of a base station in a wireless communication system according to an embodiment. Terms such as " . . . unit", " . . . part", or the like used below refers to a unit that processes at least one function or operation, and may be implemented by hardware, software, or a combination of hardware and software.

Referring to FIG. 2, the base station 110 includes a wireless communication unit 210, a backhaul communication unit 220, a storage unit 230, and a controller 240.

The wireless communication unit 210 performs a function for transmitting or receiving a signal through a wireless channel. For example, the wireless communication unit 210 may perform a conversion function between a baseband signal and a bit stream according to a physical layer standard of a system. When transmitting data, the wireless communication unit 210 may generate complex symbols by coding and modulating a transmission bit stream. When receiving data, the wireless communication unit 210 may restore a bit stream by demodulating and decoding a baseband signal. The wireless communication unit 210 up-converts the baseband signal into a radio frequency (RF) band signal, transmits the RF band signal through an antenna, and down-converts the RF band signal received through the antenna into a baseband signal.

To this end, the wireless communication unit 210 may include a transmission filter, a reception filter, an amplifier, a mixer, an oscillator, a digital to analog converter (DAC), an analog to digital converter (ADC), and the like. The wireless communication unit 210 may include multiple transmission/reception paths. The wireless communication unit 210 may include at least one antenna array including multiple antenna elements. In terms of hardware, the wireless communication unit 210 may include a digital unit and an analog unit, and the analog unit may include multiple sub-units according to operating power and operating frequency, for example.

The wireless communication unit 210 may transmit or receive a signal. To this end, the wireless communication unit 210 may include at least one transceiver. For example, the wireless communication unit 210 may transmit a synchronization signal, a reference signal, system information, a message, control information, data, or the like. The wireless communication unit 210 may perform beamforming.

The wireless communication unit 210 transmits and receives signals, so the entirety or a portion of the wireless communication unit 210 may be referred to as a transmitter, receiver, or transceiver. Herein, transmission and reception performed through a wireless channel are used as a meaning including performing the above-described processing by the wireless communication unit 210.

The backhaul communication unit 220 may provide an interface for performing communication with other nodes in the network. That is, the backhaul communication unit 220 may convert a bit stream transmitted from the base station 110 to another node, for example, another access node, another base station, an upper node, and a core network into a physical signal, and converts a physical signal received from another node into a bit stream.

The storage unit 230 may store data such as a basic program, an application program, and configuration information for an operation of the base station 110. The storage unit 230 may include a memory and may be configured as a volatile memory, a nonvolatile memory, or a combination of a volatile memory and a nonvolatile memory. The storage unit 230 may provide stored data according to a request of the controller 240.

The controller 240 may control general operations of the base station 110. For example, the controller 240 transmits or receives a signal through the wireless communication unit 210 or the backhaul communication unit 220. The controller 240 records and reads data in the storage unit 230. The controller 240 may perform functions of a protocol stack required by a communication standard, and thus, may include at least one processor.

The configuration of the base station 110 shown in FIG. 2 is an example of a base station and is not limited to the configuration shown in FIG. 2. That is, a portion of the configuration may be added, omitted, or modified.

Although the base station is described as one entity in FIG. 2, the disclosure is not limited thereto. The base station herein may be implemented to form an access network with a distributed deployment as well as an integrated deployment. The base station may be divided into a central unit (CU) and a digital unit (or distributed unit), and the CU and the digital unit may be implemented to perform an upper layer function (e.g., a packet data convergence protocol (PDCP) and radio resource control (RRC)) and a lower layer function (e.g., medium access control (MAC) and physical layer protocol (PHY)), respectively. The base station may further include an RU for processing an RF. The digital unit of the base station may build a beam coverage on a wireless channel.

Figure 3:
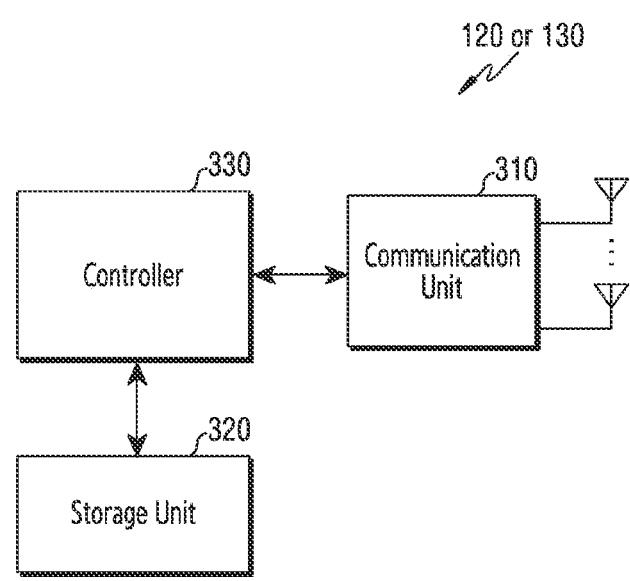
FIG. 3 illustrates a functional configuration of a terminal in a wireless communication system according to an embodiment.

FIG. 3 illustrates a functional configuration of a terminal in a wireless communication system according to Referring to FIG. 3, the terminal 120 or 130 includes a communication unit 310, a storage unit 320, and a control unit (controller) 330.

The communication unit 310 performs a function for transmitting or receiving a signal through a wireless channel. For example, the communication unit 310 may perform a conversion function between a baseband signal and a bit stream according to a physical layer standard of a system. When transmitting data, the communication unit 310 may generate complex symbols by coding and modulating a transmission bit stream. When receiving data, the communication unit 310 may restore a bit stream by demodulating and decoding a baseband signal. The communication unit 310 up-converts the baseband signal into an RF band signal and transmits the RF band signal through an antenna, and down-converts the RF band signal received through the antenna into a baseband signal. For example, the communication unit 310 may include a transmission filter, a reception filter, an amplifier, a mixer, an oscillator, a DAC, an ADC, and the like.

The communication unit 310 may include multiple transmission/reception paths, an antenna unit, and at least one antenna array including multiple antenna elements. In terms of hardware, the communication unit 310 may include a digital circuit and an analog circuit (e.g., an RF integrated circuit (RFIC)). The digital circuit and the analog circuit may be implemented as a single package. The communication unit 310 may include multiple RF chains and may perform beamforming. The communication unit 310 may apply a beamforming weight on a signal to assign directivity to the signal to be transmitted or received according to the configuration of the controller 330. The communication unit 310 may include an RF block or RF unit. The RF block may include a first RF circuit (circuitry) associated with an antenna and a second RF circuit (circuitry) associated with baseband processing. The first RF circuit may be referred to as an RF-antenna (RF-A). The second RF circuit may be referred to as an RF-baseband (RF-B).

The communication unit 310 may transmit or receive a signal, and thus, may include at least one transceiver. The communication unit 310 may receive a downlink signal including a synchronization signal (SS), a reference signal (RS) (e.g., a cell-specific reference signal (CRS), and a demodulation (DM)-RS), system information (e.g., master information block (MIB), system information block (SIB), remaining system information (RMSI), and other system information (OSI)), a configuration message, control information, downlink data, or the like. The communication unit 310 may transmit a uplink signal having a random access-related signal (e.g., a random access preamble (RAP) (or message 1 (Msg1)) and message 3 (Msg3)), a reference signal (e.g., a sounding reference signal (SRS) and DM-RS), a power headroom report (PHR), or the like.

The communication unit 310 may include different communication modules to process signals of different frequency bands. The communication unit 310 may include multiple communication modules to support different wireless access technologies. For example, the different wireless access technologies may include Bluetooth low energy (BLE), wireless fidelity (Wi-Fi), WiFi gigabyte (WiGig), cellular networks (e.g., long term evolution (LTE)), a new radio (NR), etc. The different frequency bands may include a super high frequency (SHF) (e.g., 2.5 GHz and 5 GHz) band and a millimeter wave (e.g., 38 GHz, 60 GHz, and the like) band. The communication unit 310 may use the same radio access technology on different frequency bands (e.g., unlicensed bands for licensed assisted access (LAA), and citizens broadband radio service (CBRS) (e.g., 3.5 GHz)).

The communication unit 310 transmits and receives signals as described above. Accordingly, the entirety or a portion of the communication unit 310 may be referred to as a transmitter, receiver, or transceiver. In addition, in the following description, transmission and reception performed through a wireless channel are used as a meaning including performing the above-described processing by the communication unit 310.

The storage unit 320 may store data such as a basic program, an application program, and configuration information for an operation of the terminal 120. The storage unit 320 may be configured as a volatile memory, a nonvolatile memory, or a combination of a volatile memory and a nonvolatile memory. The storage unit 320 may provide stored data according to a request of the controller 330.

The controller 330 may control general operations of the terminal 120 or 130. For example, the controller 330 transmits and receives a signal through the communication unit 310. The controller 330 records and reads data in the storage unit 320. The controller 330 may perform functions of a protocol stack required by a communication standard. To this end, the controller 330 may include at least one processor or a micro-processor, or may be a part of the processor. A part of the communication unit 310 and the controller 330 may be referred to as a CP. The controller 330 may include various modules for performing communication. According to various embodiments, the controller 330 may control the terminal to perform operations according to various embodiments. The configuration of the terminal 120 or 130 shown in FIG. 3 merely amounts to an example of a terminal and an example of a terminal performing various embodiments of the disclosure is not limited to the configuration shown in FIG. 3. That is, a portion of the configuration may be added, omitted, or modified.

Figure 4:
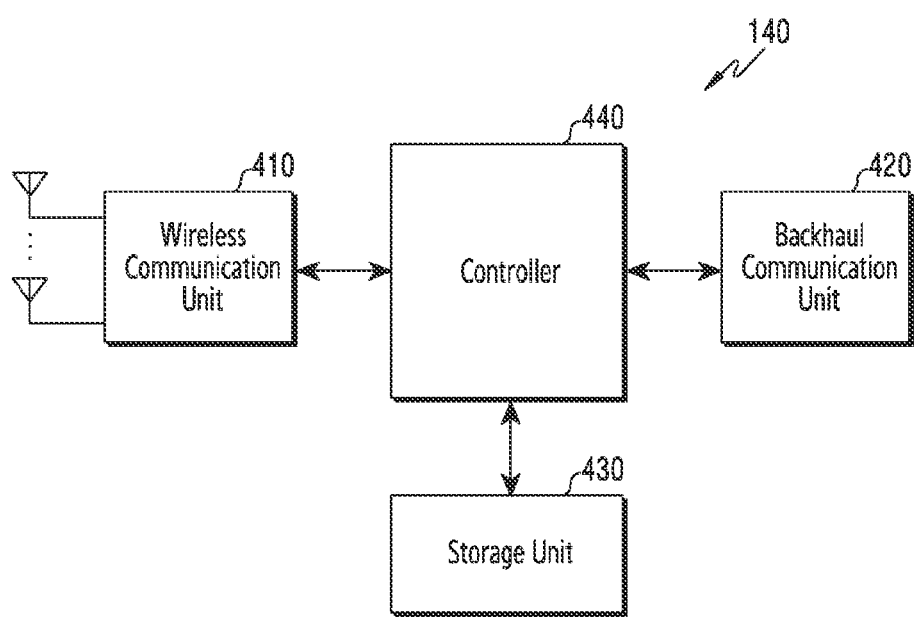
FIG. 4 illustrates a functional configuration of a RIS in a wireless communication system according to an embodiment.

FIG. 4 illustrates a functional configuration of a RIS in a wireless communication system according to an embodiment. Specifically, FIG. 4 may be understood as a functional configuration of an RC included in the RIS.

Referring to FIG. 4, the RIS 140 includes a wireless communication unit 410, a backhaul communication unit 420, a storage unit 430, and a controller 440.

The wireless communication unit 410 performs a function for transmitting or receiving a signal through a wireless channel. For example, the wireless communication unit 410 may perform a conversion function between a baseband signal and a bit stream according to a physical layer standard of a system. When transmitting data, the wireless communication unit 410 may generate complex symbols by coding and modulating a transmission bit stream. When receiving data, the wireless communication unit 410 may restore a bit stream by demodulating and decoding a baseband signal. The wireless communication unit 410 up-converts the baseband signal into an RF band signal, transmits the RF band signal through an antenna, and down-converts the RF band signal received through the antenna into a baseband signal. The wireless communication unit 410 of the RIS 140 may receive a signal from the base station 110 and reflect the received signal to be transmitted to the terminal 120 or 130. The wireless communication unit 410 of the RIS 140 may receive a signal from the terminal 120 or 130 and reflect the received signal to be transmitted to the base station 110. The RIS 140 may reflect the received signal as it is or transmit a signal generated based on information on the received signal through the wireless communication unit 410.

To this end, the wireless communication unit 410 may include a transmission filter, a reception filter, an amplifier, a mixer, an oscillator, a DAC, an ADC, and the like. The wireless communication unit 410 may include multiple transmission/reception paths. The wireless communication unit 410 may include at least one antenna array including multiple antenna elements. In terms of hardware, the wireless communication unit 410 may include a digital unit and an analog unit, and the analog unit may include multiple sub-units according to operating power or operating frequency, for example.

The wireless communication unit 410 may include multiple REs, based on which the wireless communication unit 410 may reflect a signal. In case of reflection, the amplitude and phase of the received signal may be adjusted by specific values. A combination of the amplitude and phase of the signal to be adjusted may be referred to as a reflection pattern.

The wireless communication unit 410 may transmit or receive a signal. To this end, the wireless communication unit 410 may include at least one transceiver. For example, the wireless communication unit 410 may transmit a synchronization signal, a reference signal, system information, a message, control information, and data, and may perform beamforming.

The wireless communication unit 410 transmits and receives signals as described above. Accordingly, the entirety or a portion of the communication unit 410 may be referred to as a transmitter, receiver, or transceiver. Herein, transmission and reception performed through a wireless channel are used as a meaning including performing the above-described processing by the wireless communication unit 410.

The backhaul communication unit 420 may provide an interface for performing communication with other nodes in the network. That is, the backhaul communication unit 420 may convert a bit stream transmitted from the RIS 140 to another node, for example, another access node, a base station, an upper node, and a core network, and converts a physical signal received from another node into a bit stream. The RIS 140 may receive configuration information for a reflection pattern and a reflection pattern period from the base station 110 through the backhaul communication unit 420.

The storage unit 430 may store data such as a basic program, an application program, and configuration information for an operation of the RIS 140. The storage unit 430 may be configured as a volatile memory, a nonvolatile memory, or a combination of a volatile memory and a nonvolatile memory. The storage unit 430 may provide stored data according to a request of the controller 440. The storage unit 430 may pre-store information (i.e., an RIS beambook) for multiple reflection patterns to be applied to the RIS 140.

The controller 440 may control general operations of the RIS 140. For example, the controller 440 transmits or receives a signal through the wireless communication unit 410 or the backhaul communication unit 420, records and reads data in the storage unit 430, and performs functions of a protocol stack required by a communication standard. To this end, the controller 440 may include at least one processor.

The configuration of the RIS 140 shown in FIG. 4 is an example of an RIS and a base station performing embodiments herein is not limited to the configuration shown in FIG. 4.

Figure 5:
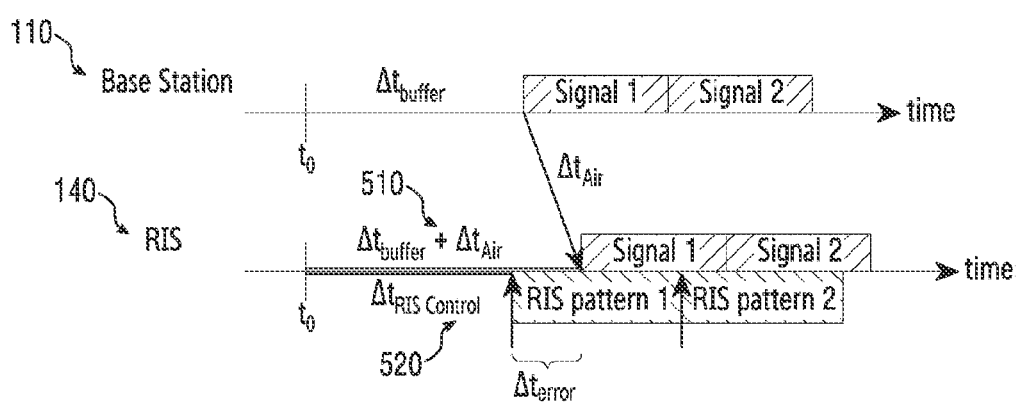
FIG. 5 illustrates an example in which an RIS pattern is applied according to a reception time point of a signal transmitted by a base station according to an embodiment.

FIG. 5 illustrates an example in which an RIS pattern is applied according to a reception time point of a signal transmitted by a base station 110 according to an embodiment. Specifically, FIG. 5 illustrates an example of a time point at which a pattern of an RIS reflection plane based on a control signal transmitted to the RC by the base station 110 is formed and a time point at which a signal to be transmitted to the terminal through the RIS reflection plane reaches the RIS reflection plane.

The control signal to be transmitted from the base station 110 to the RC may correspond to a signal for controlling the pattern of the RIS reflection plane. The signal to be transmitted to the RIS reflection plane from the base station 110 may correspond to a signal transmitted to a terminal existing in a radio shadow area and include all signals (e.g., a data signal, a control signal, and the like) for communication with the terminal. Since the controller of the RIS and the RIS reflection plane may be positioned at an adjacent distance, the distance between the base station 110 and the RC and the distance between the base station 110 and the RIS reflection plane may be substantially the same. Accordingly, the RIS 140 may include the RC or the RIS reflection plane and may be interpreted as set forth in the disclosure. Hereinafter, the signal reflected from the RIS reflection plane may be generally a signal that may be used to transmit and receive data to and from the terminal and thus may be referred to as a data signal. The signal to be transmitted to the RC from the base station 110 to control the RIS reflection plane may generally correspond to a signal used for controlling, and thus, may be referred to as a control signal.

Referring to FIG. 5, and as described above, the base station 110 may transmit the data signal and the control signal to the RIS 140 at the same time point. The RIS 140 having received the control signal from the base station 110 may control the RIS reflection plane based on the received control signal. That is, the RIS 140 may control the RIS reflection pattern based on the control signal received from the base station 110. For the sake of efficiency, the RC needs to control the RIS reflection plane to generate an optimal beam pattern (e.g., a phase or amplitude for beamforming) corresponding to each signal to be transmitted to the terminal by the base station 110 through the RIS reflection plane. In this case, the RC needs to be able to control the RIS reflection plane to generate the beam pattern suitable for each data signal in accordance with the time point at which the data signal reaches the RIS reflection plane. However, transmission paths of the control signal transmitted to the RC and the data signal transmitted to the RIS reflection plane from the base station 110 may be different from each other, or a predetermined time delay may occur before the beam pattern is switched on the RIS reflection plane after the RC receives the control signal. Even when the base station 110 transmits the control signal and the data signal at the same time point, a case in which a beam pattern suitable for the data signal may not be switched at an appropriate time point may occur. Accordingly, in order to apply a desired RIS reflection pattern to the data signal transmitted to the RIS 140 by the base station 110, a method for synchronizing the timing controlling the RIS reflection plane with the data signal transmitted to the RIS reflection plane is required.

FIG. 5 illustrates an example of timing delay which may occur during signal transmission using the RIS reflection plane based on the time axis. Referring to FIG. 5, the base station 110 may transmit a data signal and a control signal to the RIS at the same time point to. A predetermined delay time 520 may occur from a time point at which the base station 110 transmits the control signal to a time point at which the RIS performs switching of the RIS pattern based on the received control signal. Hereinafter, a time period from a time point at which the base station 110 transmits the control signal to a time point at which the RIS pattern of the RIS reflection plane is switched may be referred to as a delay time 520 for the control signal. A predetermined delay time 510 may occur from a time point at which the base station 110 transmits the data signal to a time point at which the RIS 140 receives the data signal (e.g., reflects the data signal to be transmitted to the terminal). A time period from a time point at which the base station 110 transmits the data signal to a time point at which the RIS reflection plane receives the data signal may be referred to as a delay time 510 for the data signal.

Even if the control signal and the data signal are transmitted at the same time point, the time point at which the data signal is reflected and the time point at which the RIS reflection pattern corresponding thereto is applied may not coincide depending on the transmission path or the reflection pattern (or beam pattern) switching delay time. For example, unlike the wiredly transmitted control signal, when the transmission path for transmitting the data signal includes a buffer or a wireless transmission path, a delay time greater than the time taken for the control signal to reach the RIS 140 may be required. The delay time may vary depending on a number of signals held by the buffer through which the data signal passes. In this case, the delay time 510 for the data signal may include the sum of a delay time caused by the buffer and a delay time required for the signal to be transmitted through the wireless path, whereas the delay time 520 for the control signal may include only a delay time for switching the RIS reflection plane, and thus an error interval may occur. Accordingly, a method for achieving effective RIS signal transmission and adjusting the reflection pattern by minimizing the above-described error interval will be described.

Figure 6:
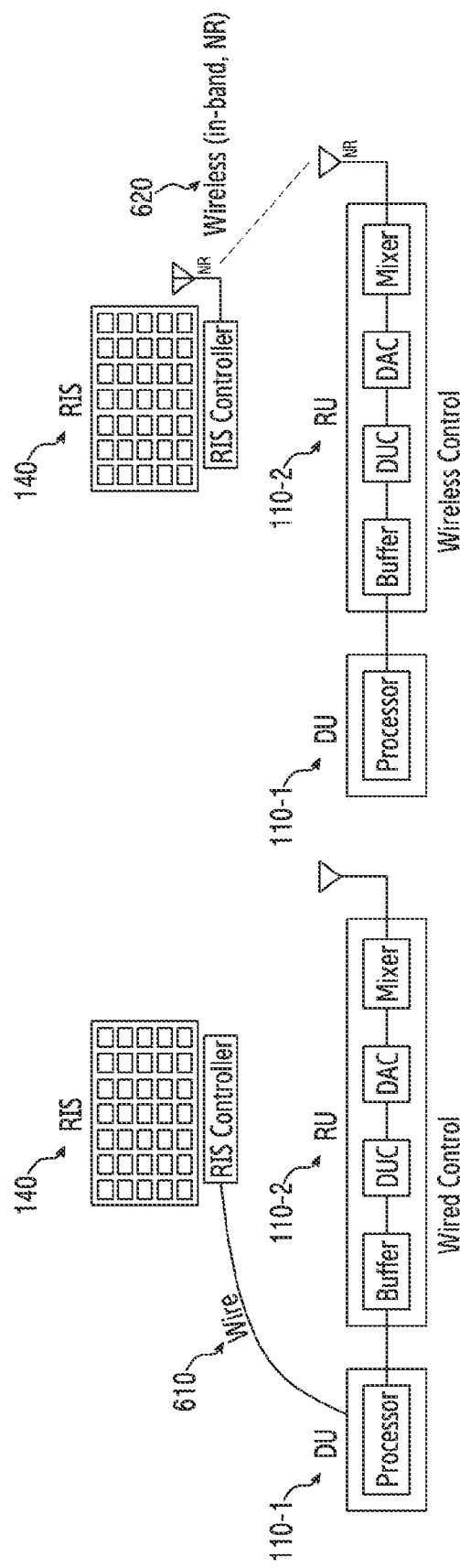
FIG. 6 illustrates a network structure of a base station and an RIS which are wiredly or wirelessly connected to each other according to an embodiment.

FIG. 6 illustrates a network structure of a base station and an RIS which are wiredly or wirelessly connected to each other according to an embodiment. Specifically, FIG. 6 illustrates an example of a transmission path of a data signal and a control signal transmitted by the base station to the RIS.

FIG. 6 illustrates two transmission structures in which the base station 110-1 performs transmission with the RIS 140. However, this is merely an example, and signals may be transmitted using a variety of transmission paths or combinations thereof.

In FIG. 6, a control signal transmitted by the base station 110-1 to the RC may be transmitted through a wireline 610. The control signal transmitted by the base station to the RC to control the RIS reflection plane may be transmitted from a distributed unit (DU) 110-1 of the base station. The DU included in the base station may be realized to perform a lower layer function and may include a processor 110-1 for performing a control function. The control signal transmitted by the base station is transmitted to an RC rather than to multiple objects and may be transmitted regardless of processing of analog or digital signals. Accordingly, the DU of the base station including the processor may be connected to the RC through the wireline 610 so that the control signal may be transmitted. However, a data signal transmitted by the base station is a signal required to be transmitted through wireless communication 620 and may require a separate signal processing procedure. Accordingly, the data signal may be transmitted after undergoing a conversion procedure by an RU 110-2 performing a signal processing function. The RU may perform a function for processing a signal to wirelessly transmit the signal and may include a buffer required for the signal processing procedure. Accordingly, transmission of a signal via a buffer for wireless communication may generally have a greater delay time than transmission of a signal wiredly transmitted, and thus an error may occur between a time point at which the data signal is received and a time point at which the reflection pattern is switched.

Secondly, the control signal transmitted by the base station to the RC to control the RIS reflection plane and the data signal transmitted to the RIS reflection plane may be transmitted from the RU 110-2 of the base station. In this case, both the data signal and the control signal are transmitted via the buffer included in the RU 110-2, and thus a delay time caused by the buffer may not occur. However, even in this case, a delay time required for switching a pattern of the RIS reflection plane after the RC receives the control signal may occur, and thus an error may occur between the time points of the data signal reception and the reflection pattern switching.

According to an embodiment, before performing an operation disclosed in various embodiments, the base station may identify whether to transmit the control signal wiredly 610 or wirelessly 620. In case of identifying that the RC and the processor 110-1 of the DU are connected through the wireline 610, The base station may perform an operation of transmitting the control signal, or when there is no wired connection to the RC, the base station may perform an operation of wirelessly 620 transmitting the control signal through an antenna of the RU 110-2.

Transmission of the control signal and the data signal transmitted by the base station is not limited to the example shown in FIG. 6 and may be performed through a combination of various paths.

Figure 7:
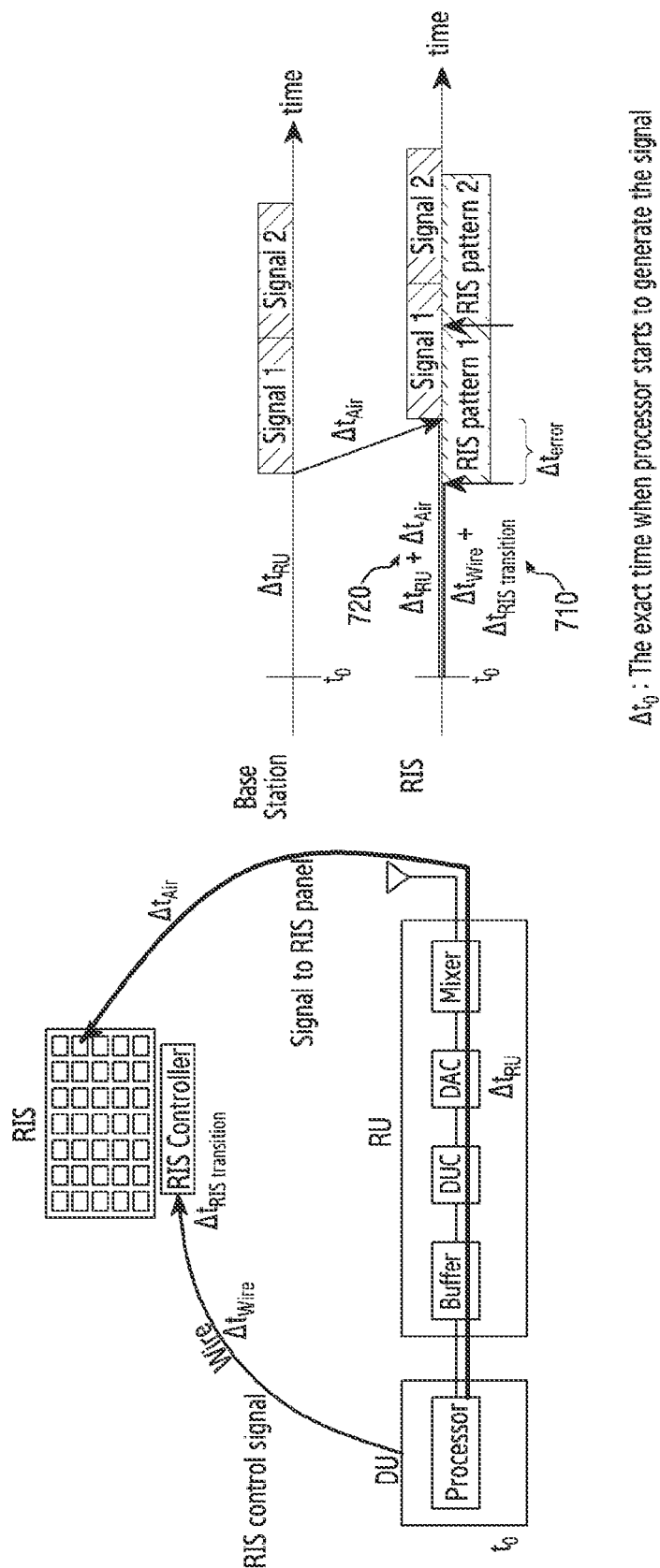
FIG. 7 illustrates an example of reception time points of a signal received from a base station and an RIS control signal received wiredly according to an embodiment.

FIG. 7 illustrates an example of reception time points of a signal received from a base station and an RIS control signal received wiredly according to an embodiment. Specifically, FIG. 7 illustrates when the control signal is transmitted through a wireline to the RC by the base station in FIG. 6.

Referring to FIG. 7, the base station may control the RIS through a wire 710 separately connected to the DU. The control signal transmitted to the RC by the base station to control the RIS may be transmitted through the wire 710 connected between the DU and the RC. The control signal transmitted to the RC by the base station may be transmitted from the processor included in DU. The control signal transmitted to the RC by the base station may include information for controlling the reflection pattern of the RIS reflection plane and a signal for controlling the RIS, such as information on the RIS beam pattern and information on the data signal for synchronization.

A time elapsed between a time point at which the processor of the DU transmits the control signal including control information for the RIS reflection pattern and a time point at which the RC receives the control signal may be referred to as a line delay time $\Delta t_{wire}$. The line delay time may include a signal frequency delay of a wired cable (e.g., Ethernet). a time required to change (or switch) the beam pattern of the RIS reflection plane by the RC having received the control signal may be referred to as a switching delay time $\Delta t_{RIS\ transition}$. The switching delay time may include a signal processing time of the RC and a physical delay time required to switch a beam of the RIS reflection pattern. a time 710 required after the processor of the DU transmits the control signal to control the RIS reflection pattern, until switching of the beam pattern of the RIS reflection plane is completed based on the control signal may be expressed as a sum of the line delay time and the switching delay time.

A time interval required between a time point at which the processor of the DU transmits the data signal desired to be transmitted to the terminal and a time point at which the data signal is wirelessly 720 transmitted from the antenna through a signal processor of the RU may be referred to as an RU delay time $\Delta t_{RU}$. The RU delay time may include a delay time required to process a signal by the RU having received the data signal wirelessly transmitted from the antenna of the base station. The signal processor of the RU may include a buffer and a procedure for processing a signal through the buffer may have a generally larger delay time compared to other delay times. The delay time caused by the RU and the buffer included in the RU is illustrated, but the disclosure is not limited thereto, and may include a case where a signal wirelessly transmitted has a delay time caused by a specific object included in the base station. A time required for the data signal transmitted from the antenna of the base station to reach the RIS reflection plane through an air interface may be referred to as an air delay time $\Delta t_{air}$. The air delay time may include a signal frequency delay time in the air. A time 720 required after the processor of the DU transmits the data signal desired to be transmitted to the terminal, until the data signal reaches the RIS reflection plane may be expressed as a sum of the RU delay time and the air delay time.

In case that the processor of the DU performs a command to transmit an RIS control signal through a wireline and the data signal transmitted toward the RIS reflection plane to be transmitted to the terminal at the same time point $t_0$, the two signals having different transmission paths may have different delay times as described above. Accordingly, when the data signal reaches the RIS reflection plane, a beam pattern of a suitable reflection plane may not be applied to each data signal. For example, due to the buffers included in the RU, the time required for a signal to be processed may be significantly larger than the other delay times that are typically required. The delay time 710 required after the processor of the DU transmits the control signal until the RIS reflection pattern is applied may have a value larger than that of the delay time 720 after the processor of the DU transmits the data signal until the data signal reaches the RIS reflection plane. A difference between the two delay times may include an error time $\Delta t_{error}$.

Figure 8A:
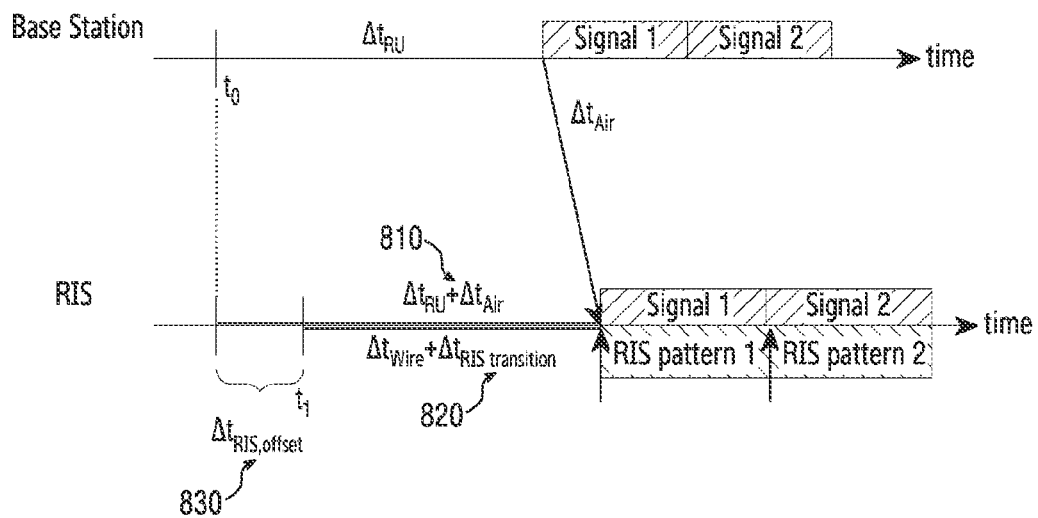
FIG. 8A illustrates an example of synchronizing an RIS pattern application time point when an RIS control signal is wiredly received according to an embodiment.

FIG. 8A illustrates an example of synchronizing an RIS pattern application time point when an RIS control signal is wiredly received according to an embodiment. Specifically, FIG. 8A illustrates an example of synchronization of RIS pattern application time points in case that the base station may know the number of signals in the buffer of the RU.

As described above, two signals having different transmission paths through which the base station performs transmission may have different delay times 810 and 820. Accordingly, when the data signal reaches the RIS reflection plane, a beam pattern of a suitable reflection plane may not be applied to each data signal. In case that the time points (e.g., time points at which the command for transmitting two signals is performed) at which the processor of the DU transmits two signals are identical, the delay time during which the signal is processed in the buffer included in the RU may have a larger value. Accordingly, there may be an error time between the time point at which the data signal reaches the reflection plane and the time point at which the RC receives the control signal and application of the RIS reflection pattern is completed. The base station (e.g., the processor of the DU included in the base station) may know the amount of signals in the buffer of the RU, and accordingly, may know the delay time (e.g., the RU delay time) of the data signal caused by the RU.

In order to transmit the data signal by applying an optimal RIS reflection pattern, the base station needs to synchronize the time point at which the data signal reaches the reflection plane and the time point at which the RIS reflection pattern is applied. The base station may apply a time offset 830 when transmitting the control signal to the RC. That is, the base station may apply the time offset 830 corresponding to the error time between the data signal transmission time point and the control signal transmission time point and transmit the two signals. The base station may transmit the data signal and the control signal at the same time point and the RIS having received the control signal may apply the time offset and switch the RIS reflection pattern after receiving the control signal, wherein the time offset may be referred to as an RIS offset $\Delta T_{RIS,Offset}$ 830. As shown in FIG. 8A, in case that the RIS offset 830 is applied (e.g., in case that the control signal is transmitted at a time point $t_1$) when the base station transmits the control signal, the time point at which the data signal reaches the reflection plane and the time point at which the RIS pattern is applied based on the control signal may be synchronized.

Figure 8B:
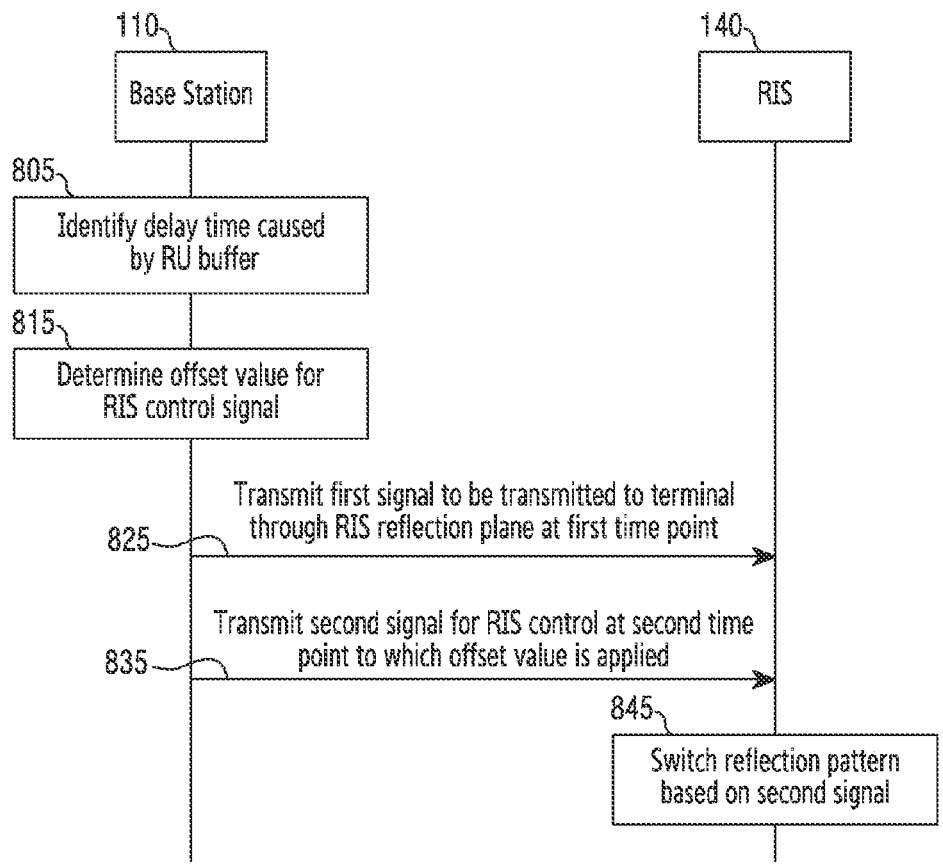
FIG. 8B illustrates a signal flow for synchronizing an RIS pattern application time point when an RIS control signal is wiredly received according to an embodiment.

FIG. 8B illustrates a signal flow for synchronizing an RIS pattern application time point when an RIS control signal is wiredly received according to an embodiment. Specifically, FIG. 8B illustrates a signal flow for synchronization of RIS pattern application time points in case that the base station may know the number of signals in the buffer of the RU. The base station in FIG. 8B may include the processor of the DU included in the base station.

In step 805, the base station may identify a delay time caused by the RU buffer. Specifically, the processor of the DU controlling signal transmission of the base station may identify the size of the buffer of the RU, the number of signals included in the buffer, and the like in real time. The DU processor of the base station may identify a delay time of a signal caused by the buffer, based on the identified information on the buffer. The DU processor of the base station may transmit or receive an information request for the buffer or identification message to or from the RU at predetermined intervals to identify information on the buffer in real time. The RU delay time $\Delta t_{RU}$ may include a delay time $\Delta t_{RU,Buffer}$ elapsed in the buffer of the RU and a delay time $\Delta t_{RU,else}$ elapsed in other processing units of the RU. The delay time caused in the signal processing procedure by the buffer during the signal processing procedure of the RU may be large, and the RU delay time may be generally determined by a value of the delay time elapsed in the buffer of the RU. Accordingly, the RU delay time described herein may indicate a delay time elapsed in the buffer of the RU. The base station (e.g., the processor of the DU) may identify information including information on the size of the buffer included in the RU, the size of a current buffer element, a sampling rate, and the like. The base station may identify the RU delay time, based on the information on the buffer. For example, in case that the buffer size is 375,000 real and imaginary (I/Q) samples, the current buffer element size (e.g., the number of signals included in the buffer) is 120,000 I/Q samples, and in case that the sampling rate is 20 Msamples/s, the RU delay time may be $$\frac{120{,}000}{20\ M} = 6\ ms.$$

The base station having identified the information on the buffer of the RU may identify the RU delay time, based thereon.

In step 815, the base station may determine an offset value for the RIS control signal. The offset value for the RIS control signal may be a value corresponding to the error time between the transmission time point of the data signal and the transmission time point of the control signal. The offset value for the RIS control signal may include an RIS offset. The offset determined by the base station may be determined by Equation (1) below.

$$\Delta T_{RIS,Offset} = \Delta t_{RU} + \Delta t_{Air} - (\Delta t_{Wire} + \Delta t_{RIS\ transition})$$

In Equation (1), $\Delta T_{RIS,Offset}$ indicates the RIS offset. $\Delta t_{Air}$ may indicate the air delay time and may be determined based on the distance between the RU antenna and the RIS reflection plane. $\Delta t_{wire}$ may indicate the line delay time and may be determined based on measurement of a round trip delay (RTD) in case of a wired network environment. $\Delta t_{RIS\ transition}$ may indicate the switching delay time and may be determined based on a voltage change of a PIN diode connected to the RIS. Among elements for determining the offset value, when assuming that $\Delta t_{Air}$, $\Delta t_{Wire}$ and $\Delta t_{RIS\ transition}$ have fixed values, the RIS offset may be determined based on $\Delta t_{RU}$.

The base station may determine the RIS offset value based on the RU delay time having been identified in step 805. For example, in case that the number of signals (e.g., amount of data) included in the buffer is large, the RU delay time may increase and accordingly, the RIS offset value determined by the base station may have a larger value. The base station may apply the determined RIS offset value to control the control signal.

In step 825, the base station may transmit the data signal to be transmitted to the terminal through the RIS reflection plane. The data signal transmitted to the RIS reflection plane by the base station may correspond to a signal transmitted to the terminal which is positioned in a radio shadow area. To be distinguished from the control signal transmitted to the RC by the base station, the data signal is described as a data signal for convenience and may include all signals (e.g., the data signal, the control signal, and the like) for communication with the terminal. A predetermined delay time may occur from a time point at which the base station transmits the data signal to a time point at which the RIS reflection plane receives the data signal (e.g., the time point of reflection toward the terminal). The delay time of the data signal occurring in transmission and reception of the data signal may correspond to a sum of the RU delay time and the air delay time.

In step 835, the base station may transmit the control signal for RIS control to the RC. The control signal to be transmitted from the base station to the RC may correspond to a signal for controlling the pattern of the RIS reflection plane. The base station may transmit the RIS control signal at the time point at which the RIS offset having been determined in step 815 is applied. A predetermined delay time may occur from a time point at which the base station transmits the control signal to a time point at which the RC receives the control signal and applies the RIS reflection pattern based thereon. The delay time of the control signal occurring from the transmission time point of the control signal to the switching time point of the RIS reflection pattern may correspond to a sum of the line delay time and the RIS switching delay time. As described above, the delay time caused by the buffer of the RU is generally larger than other delay times, and thus, the delay time of the data signal may be larger than the delay time of the control signal. Accordingly, in order to synchronize the reception time point of the data signal and the switching time point of the RIS reflection pattern, the base station may transmit the control signal after the determined RIS offset value from the time point of transmitting the data signal.

Steps 825 and 835 may be simultaneously performed, and the base station may use the RIS offset value. The control signal transmitted by the base station to the RC may include information indicating the RC to receive the control signal and then to apply the RIS reflection pattern after the RIS offset. For example, the base station may transmit the data signal and the control signal at the same time point (e.g., $t_0$), and the RC having received the control signal in advance before the data signal reaches the RIS reflection plane due to the large delay time of the data signal may switch the RIS reflection pattern. However, in case that the control signal received by the RC includes information on the RIS offset, the RC may receive the control signal and then control the RIS reflection plane so that the RIS reflection pattern is applied after the RIS offset determined by the base station. Accordingly, to synchronize the reception time point of the data signal and the switching time point of the RIS reflection pattern, the base station may transmit the control signal so that the RC receives the control signal and then the reflection pattern is applied after the RIS offset value.

In step 845, the RIS may apply (e.g., switch) the reflection pattern based on the control signal received from the base station. Specifically, the RC may control the RIS reflection pattern to be produced based on the control signal received from the base station. Thus, the time point at which the RIS receives the data signal from the base station may be the same as the time point at which the RIS applies (e.g., performs RIS element adjustment according to a beam pattern) the RIS reflection pattern based on the control signal. The time point at which the RIS reflection plane receives the data signal from the base station may be the same as the time point at which the RIS reflection pattern is applied based on the control signal transmitted after the RIS offset from the time point at which the base station transmits the data signal. The time point at which the RIS reflection plane receives the data signal from the base station may be the same as the time point at which the RIS reflection pattern is applied based on the control signal including the information on the RIS offset. Accordingly, the RIS may reflect the data signal to the terminal based on the switched RIS reflection pattern.

Through the above-described operations, in case that the base station is wiredly connected to the RC and the base station may accurately identify the RIS offset value by identifying the amount of the buffer included in the RU in real time, the RC may apply an appropriate RIS reflection pattern to the data signal to be reflected to the terminal at an optimal time point.

Figure 9A:
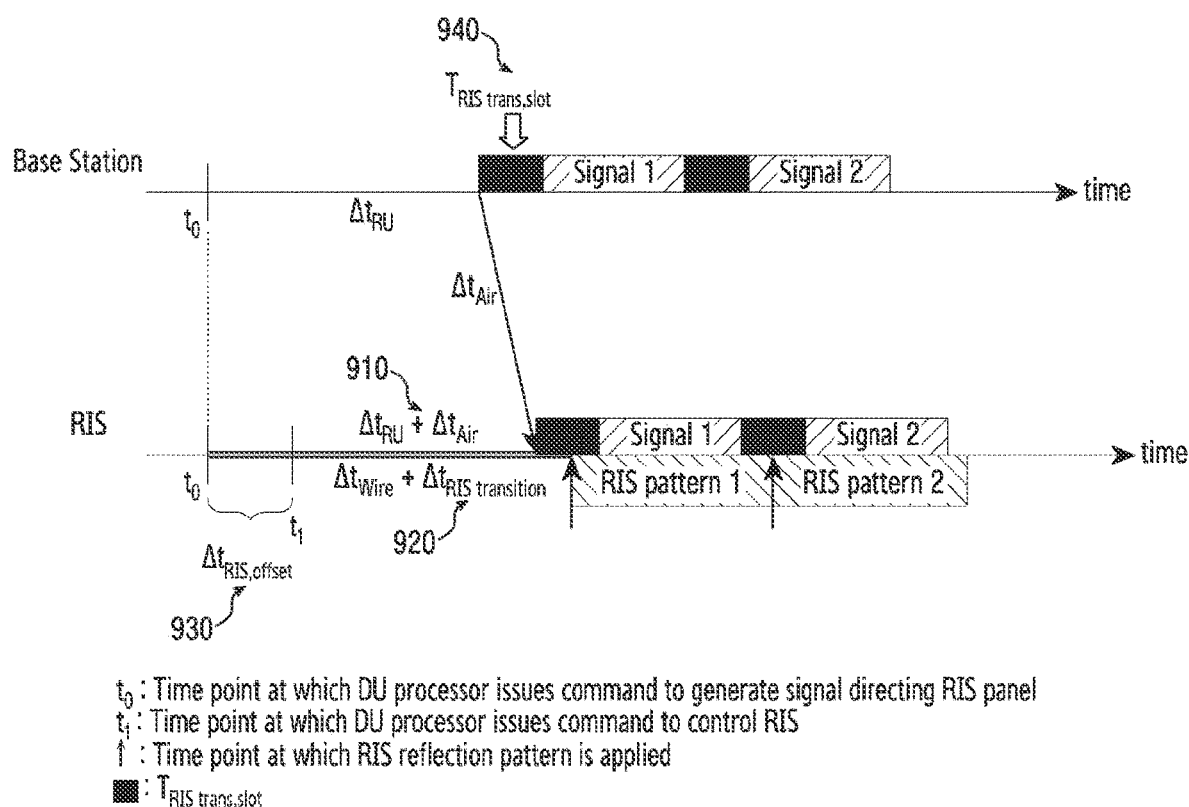
FIG. 9A illustrates an example of synchronizing an RIS pattern application time point by using an RIS beam switching slot when an RIS control signal is wiredly received according to an embodiment.

FIG. 9A illustrates an example of synchronizing an RIS pattern application time point by using an RIS beam switching slot (e.g., a slot for reflection pattern switching) when an RIS control signal is wiredly received according to an embodiment. Specifically, FIG. 9A illustrates an example of synchronization of RIS pattern application time points in case that the base station may not accurately know the number of signals in the buffer of the RU.

As described above, two signals having different transmission paths through which the base station performs transmission may have different delay times 910 and 920. Accordingly, when the data signal reaches the RIS reflection plane, a beam pattern of a suitable reflection plane may not be applied to each data signal. In case that the time points at which the command for transmitting two signals is performed and at which the processor of the DU transmits two signals are the identical, the delay time during which the signal is processed in the buffer included in the RU may have a larger value. Accordingly, there may be an error time between the time point at which the data signal reaches the reflection plane and the time point at which the RC receives the control signal and application of the RIS reflection pattern is completed. There may be a case in which the processor of the DU included in the base station may not accurately know the number of signals in the buffer of the RU, and accordingly, the base station may not accurately know the RU delay time of the data signal caused by the RU.

In order to transmit the data signal by applying an optimal RIS reflection pattern, the base station needs to synchronize the time point at which the data signal reaches the reflection plane and the time point at which the RIS reflection pattern is applied. The base station may apply a time offset 930 when transmitting the control signal to the RC. That is, the base station may apply the time offset corresponding to the error time between the data signal transmission time point and the control signal transmission time point and transmit the two signals, which may be referred to as an RIS offset $\Delta t_{RIS,Offset}$ 930. As shown in FIG. 9A, when transmitting the control signal, the base station may apply the RIS offset 930 to synchronize the time point at which the data signal reaches the reflection plane and the time point at which the RIS patter is applied based on the control signal. However, the base station may not accurately know the RIS offset value.

In particular, the base station does not accurately measure the RU delay time but may know a value for a boundary of the buffer included in the RU. The value for the boundary of the buffer may indicate the RU delay time including an error and may include the maximum amount and the minimum amount of signals that the buffer may have. That is, the base station may know the maximum delay time $\Delta t_{RU,max}$ and the minimum delay time $\Delta t_{RU,min}$ caused by the buffer included in the RU. The base station may determine the maximum RU delay time based on a value less than the maximum value of the actual physical RU buffer to prevent overflow of the buffer included in the RU. The base station may determine the minimum RU delay time based on a value less than the minimum value of the actual physical RU buffer to prevent overflow of the buffer included in the RU. In case that the RU delay time, i.e., the RIS offset may not be accurately measured, the base station may apply a beam switching slot based on the above-described size of the buffer. Specifically, after applying the RIS offset 930 to the transmission of the control signal, the base station may additionally apply the beam switching slot to the transmission of the data signal to correct an error by compensating for timing uncertainty. The base station may apply the beam switching slot 940 between respective data signals required to be synchronized with other beam patterns. In doing so, the base station may ensure transmission of respective data signals based on the optimized RIS reflection pattern. However, application of an excessively long beam switching slot may cause a decrease in signal transmission efficiency and an increase in overhead, and as with the RIS offset value, it is important to determine the optimal beam switching slot 940. In case of a long beam switching slot, the base station may use the corresponding slot in data communication not directed to the RIS panel. For example, when the beam switching slot is long enough to include a predetermined data signal, the base station may transmit, by using the beam switching slot, the data signal to other terminals which do not communicate through the RIS.

Figure 9B:
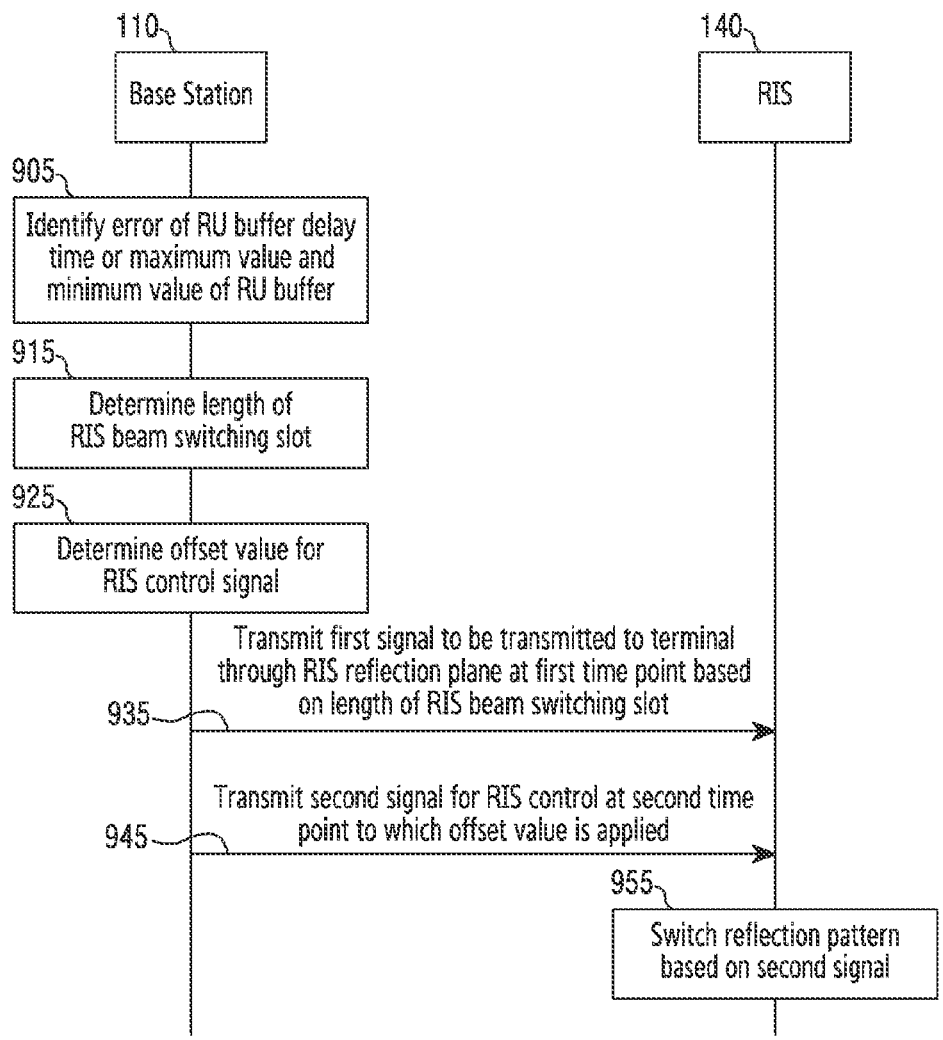
FIG. 9B illustrates a signal flow for synchronizing an RIS pattern application time point by using an RIS beam switching slot when an RIS control signal is wiredly received according to an embodiment.

FIG. 9B illustrates a signal flow for synchronizing an RIS pattern application time point by using an RIS beam switching slot when an RIS control signal is wiredly received according to an embodiment. Specifically, FIG. 9B illustrates a signal flow for synchronization of RIS pattern application time points in case that the base station may not accurately know the number of signals in the buffer of the RU. The base station in FIG. 9B may include the processor of the DU included in the base station.

In step 905, the base station may identify an error of a delay time included in the RU or the maximum value and the minimum value of the delay time. The RU delay time $\Delta t_{RU}$ may include a delay time $\Delta t_{RU,Buffer}$ elapsed in the buffer of the RU and a delay time $\Delta t_{RU,else}$ elapsed in other processing units of the RU. The delay time caused in the signal processing procedure by the buffer during the signal processing procedure of the RU may be long, and the RU delay time may be generally determined by a value of the delay time elapsed in the buffer of the RU. Herein, the RU delay time may indicate a delay time elapsed in the buffer of the RU. The base station may determine the beam switching slot based on the identified error of the delay time or the maximum value and the minimum value of the delay time and may compensate the error of the RIS offset by applying the beam switching slot to the data signal.

The base station may not know the accurate RU delay time in real time but may know the boundary value of the RU delay time and the error value therefor. In this case, the boundary value of the RU delay time may be determined based on the error value based on a buffer element value of the RU identified by the DU processor of the base station. The error value may be determined based on time accuracy of the DU processor. The DU processor may identify the size of the buffer of the RU, the number of signals included in the buffer, and the like. The DU processor of the base station may transmit or receive an information request for the buffer or identification message to or from the RU at predetermined intervals to identify information on the buffer. However, the information on the buffer identified by the DU processor of the base station may include an error rather than an accurate value.

The base station may not know an accurate RU delay time and an error value corresponding thereto in real time. In this case, a boundary value of the RU delay time may be determined based on the maximum value and the minimum value of the buffer size of the RU identified by the DU processor. The value for the boundary of the buffer may include the maximum amount and the minimum number of signals that the buffer may include. That is, the base station may know the maximum delay time $\Delta t_{RU,max}$ and the minimum delay time $\Delta t_{RU,min}$ caused by the buffer included in the RU. The base station may determine the maximum RU delay time based on a value less than the maximum value of the actual physical RU buffer to prevent overflow of the buffer included in the RU. The base station may determine the minimum RU delay time based on a value less than the minimum value of the actual physical RU buffer to prevent overflow of the buffer included in the RU.

In step 915, the base station may determine a length of the RIS beam switching slot. The base station may apply the RIS beam switching slot to transmission of the data signal in order to compensate for an error that may occur even when the offset is applied to transmission of the control signal. For example, after applying the RIS offset to the transmission of the control signal, the base station may additionally apply the beam switching slot to the transmission of the data signal to correct an error (e.g., to compensate for timing uncertainty). The base station may apply the beam switching slot between respective data signals required to be synchronized with other beam patterns. By doing so, the base station may further ensure transmission of respective data signals based on an appropriate RIS reflection pattern. The base station may determine the beam switching slot based on the boundary value of the RU delay time to determine the optimal beam switching slot.

In case that the base station does not know the accurate RU delay time in real time but knows the boundary value of the RU delay time and the error value (e.g., an error rate) therefor, the length of the beam switching slot may be determined by Equation (2) below.

$$T_{RIStrans,slot} = 2 \times \text{Error} \qquad (2)$$

For example, when the error value (e.g., the margin of error) of the RU buffer that the DU processor may identify is 200 I/Q samples at a 99% confidence level, and the I/Q sampling rate is 20 M samples/s, the length of the beam switching slot may be $$2 \times \frac{200}{2\,M} = 200\ \mu s.$$

The length of the beam switching slot may be determined according to the time accuracy of the DU processor.

When the base station does not know the accurate RU delay time or the error value therefor, the length of the beam switching slot may be determined by Equation (3) below.

$$T_{RIStrans,slot} = \Delta t_{RU,max} - \Delta t_{RU,min} \quad (3)$$

In Equation (3), $\Delta t_{RU,max}$ may be the maximum value of the RU delay time, and $\Delta t_{RU,min}$ may be the minimum value of the RU delay time. For example, in case that the maximum value of the buffer size identified by the DU processor is 8,000 I/Q samples, the minimum value of the buffer size is 2,000 I/Q samples, and the sampling rate of the RU is 20 M samples/s, the maximum value of the RU delay time may be $$\Delta t_{RU,max} = \frac{8,000}{20\,M} = 4\ ms,$$

and the minimum value of the RU delay time may be $$\Delta t_{RU,min} = \frac{2,000}{20\,M} = 1\ ms.$$

The length of the beam switching slot may be determined as $T_{RIStrans,slot} = 4\ ms - 1\ ms = 3\ ms$. The length of the beam switching slot may be determined by the maximum value and the minimum value of the RU buffer configured for the base station to operate a system stably. The length of the beam switching slot may be variously determined by not only the difference between the maximum value and the minimum value, but also the average value of the maximum value and the minimum value, a value obtained by multiplying a constant weight, and the like.

The DU processor (i.e., the base station) may know the maximum value and the minimum value of the RU buffer size, or identify information about the size of the buffer by transmitting and receiving an information request or identification message about the buffer to or from the RU according to a predetermined period. The processor of the DU may identify the maximum value and the minimum value of the RU delay time based on the identified maximum value and minimum value of the buffer size and may determine the length of the RIS beam switching slot accordingly. Even when the base station knows the error value for the RU delay time, the length of the beam switching slot may be determined by Equation (3), and when the RU delay time may be identified in real time, the length of the beam switching slot may be determined using the error value in order to apply a more accurate RIS reflection pattern.

In step 925, the base station may determine an offset value for the RIS control signal, which may be a value corresponding to the error time between the transmission time point of the data signal and the transmission time point of the control signal. The offset value for the RIS control signal may include an RIS offset and is described in FIG. 8B. However, when the base station does not know accurately the RU delay time, the maximum value $\Delta t_{RU,max}$ of the RU delay time which may be identified by the base station may be applied to the RU delay time $\Delta t_{RU}$.

In step 935, the base station may transmit the data signal to be transmitted to the terminal through the RIS reflection plane. The base station may transmit the control signal including the beam switching slot having been determined in step 915. The data signal transmitted to the RIS reflection plane by the base station may correspond to a signal transmitted to the terminal which is positioned in a radio shadow area. To be distinguished from the control signal transmitted to the RC by the base station, the data signal is described as a data signal for convenience and may include all signals (e.g., the data signal, the control signal, and the like) for communication with the terminal. A predetermined delay time may occur from a time point at which the base station transmits the data signal to a time point at which the RIS reflection plane receives the data signal and reflects toward the terminal. The delay time of the data signal occurring in transmission and reception of the data signal may correspond to a sum of the RU delay time and the air delay time. The base station may transmit, toward the RIS reflection plane, the data signal to which the RIS beam switching slot is applied. Accordingly, the RIS reflection plane may reflect the data signal from the time point at the beam switching slot from the time point of receiving the data signal transmitted by the base station.

In step 945, the base station may transmit the control signal for RIS control to the RC. The control signal to be transmitted from the base station to the RC may correspond to a signal for controlling the pattern of the RIS reflection plane. The base station may transmit the RIS control signal at the time point at which the RIS offset having been determined in step 925 is applied. A predetermined delay time may occur from the time point at which the base station transmits the control signal to the time point at which the RIS reflection plane receives the control signal and applies the RIS reflection pattern based thereon. The delay time of the control signal occurring from the transmission time point of the control signal to the switching time point of the RIS reflection pattern may correspond to a sum of the line delay time and the RIS switching delay time. The delay time caused by the buffer of the RU is generally larger than other delay times and thus the delay time of the data signal may be larger than the delay time of the control signal. Accordingly, in order to synchronize the reception time point of the data signal and the switching time point of the RIS reflection pattern, the base station may transmit the control signal after the determined RIS offset value from the time point of transmitting the data signal.

Even when transmission of the data signal and transmission of the control signal are simultaneously performed, the base station may use the RIS offset value. The control signal transmitted by the base station to the RC may include information indicating the RC to receive the control signal and then to apply the RIS reflection pattern after the RIS offset. For example, the base station may transmit the data signal and the control signal at the same time point to, and the RC having received control in advance before the data signal reaches the RIS reflection plane due to the large delay time of the data signal may switch the RIS reflection pattern. However, in case that the control signal received by the RC includes information on the RIS offset, the RC may receive the control signal and then control the RIS reflection plane so that the RIS reflection pattern is applied after the RIS offset determined by the base station. Accordingly, to synchronize the reception time point of the data signal and the switching time point of the RIS reflection pattern, the base station may transmit the control signal so that the RC receives the control signal and then the reflection pattern is applied after the RIS offset value.

In step 955, the RIS may apply (e.g., switch) the reflection pattern based on the control signal received from the base station. Specifically, the RC may control the RIS reflection pattern to be produced based on the control signal received from the base station. The RU delay time identified by the base station may include an error value or accurate measurement of the RU delay time may not be possible. Therefore, the base station may compensate for uncertainty in data signal and RIS reflection pattern timing by transmitting the data signal including the RIS beam switching slot. Through the above-described operations, the time point at which the RIS receives the data signal after the beam switching slot from the base station may be the same as the time point at which the RIS performs RIS element adjustment according to the RIS reflection pattern based on the control signal. The time point at which the RIS reflection plane receives the data signal after the beam switching slot from the base station may be the same as the time point at which the RIS reflection pattern is applied based on the control signal transmitted after the RIS offset from the time point at which the base station transmits the data signal. The time point at which the RIS reflection plane receives the data signal after the beam switching slot from the base station may be the same as the time point at which the RIS reflection pattern is applied based on the control signal including the information on the RIS offset. Accordingly, the RIS may reflect the data signal to the terminal based on the switched RIS reflection pattern.

Through the above-described operations, even when the base station is wiredly connected to the RC and the base station may not accurately identify the amount of the buffer included in the RU, the RC may apply an appropriate RIS reflection pattern to the data signal to be reflected to the terminal at an optimal time point.

Figure 10:
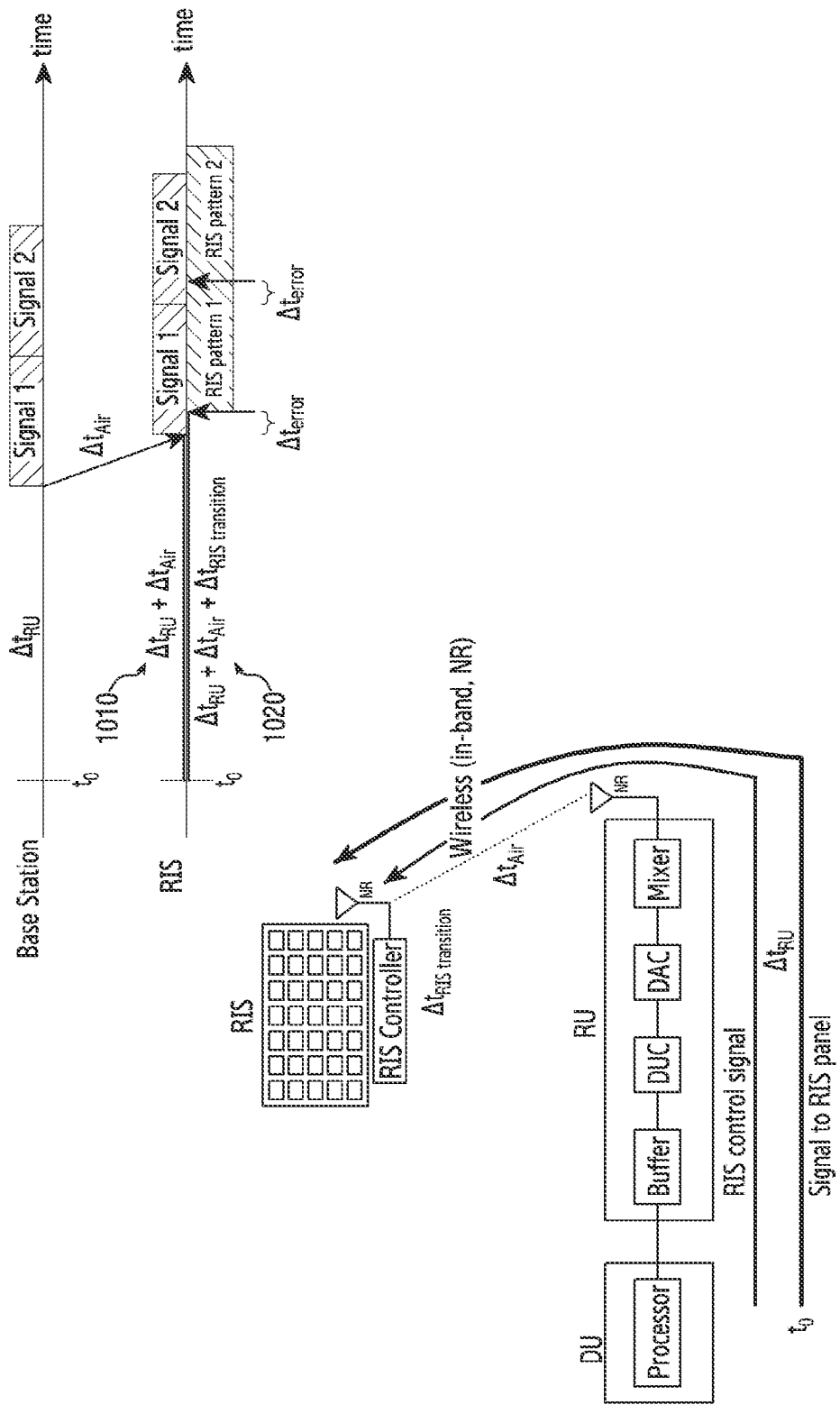
FIG. 10 illustrates an example of reception time points of a signal received from a base station and an RIS control signal received wirelessly according to an embodiment.

FIG. 10 illustrates an example of reception time points of a signal received from a base station and an RIS control signal received wirelessly according to an embodiment. Specifically, FIG. 10 illustrates when the control signal is wirelessly transmitted to the RC by the base station in FIG. 6.

Referring to FIG. 10, the base station may control the RIS through a wireless path. The control signal transmitted to the RC by the base station to control the RIS may be transmitted through an antenna of the RU. The control signal transmitted by the base station may be transmitted through an in-band of the NR. The control signal transmitted to the RC by the base station may include information for controlling the reflection pattern of the RIS reflection plane and in addition thereto, may further include a certain signal for controlling the RIS, such as information on the RIS beam pattern and information on the data signal for synchronization.

The base station may transmit the data signal and the control signal through the wireless path, and thus both the data signal and the control signal may pass through the signal processor of the RU and the air interface.

A time required between a time point at which the processor of the DU transmits the data signal or the data signal and a time point at which each signal is wirelessly transmitted from the antenna through the signal processor of the RU may be referred to as an RU delay time $\Delta t_{RU}$. The RU delay time may include a delay time required to process a signal by the RU having received each signal wirelessly transmitted from the antenna of the base station. The delay time caused by the RU and the buffer included in the RU is illustrated, but the disclosure is not limited thereto, and may include a signal wirelessly transmitted having a delay time caused by a specific object included in the base station.

A time required for the data signal or the data signal transmitted from the antenna of the base station to reach the RC or the RIS reflection plane through the air interface may be referred to as an air delay time $\Delta t_{air}$, which may include a signal frequency delay time in the air. The air delay time may be determined based on a distance between the antenna and the RC receiving a signal or the RIS reflection plane. the RC and the RIS reflection plane may be located in relatively similar positions, and thus the air delay time for the control signal or the data signal to reach the RC or RIS reflection plane via the air interface may be substantially the same.

A time 1010 required after the processor of the DU transmits the data signal desired to be transmitted to the terminal, until the data signal reaches the RIS reflection plane may be expressed as a sum of the RU delay time and the air delay time.

A time required to change (or switch) the beam pattern of the RIS reflection plane by the RC having received the control signal may be referred to as a switching delay time $\Delta t_{RIS,transition}$. The switching delay time may include a signal processing time of the RC and a physical delay time required to switch a beam of the RIS reflection pattern.

A time 1020 required after the processor of the DU transmits the control signal to control the RIS reflection pattern, until switching of the beam pattern of the RIS reflection plane is completed based on the control signal may be expressed as a sum of the RU delay time, the air delay time, and the switching delay time. As described above, the processing operation for switching the RIS reflection pattern after the RC receives the control signal may cause a delay time. Thus, when the control signal is wirelessly transmitted, the switching delay time may be further required for synchronization of the RIS reflection pattern.

In case that the base station performs a command to wirelessly transmit the RIS control signal and data signal at the same time point to, the switching delay time of the RSI reflection pattern based on the control signal as described above is further required and the two signals may have different delay times. Accordingly, when the data signal reaches the RIS reflection plane, a beam pattern of a suitable reflection plane may not be applied to each data signal. A difference between the two delay times may include an error time $\Delta t_{error}$. The error time may be substantially identical to the RSI switching delay time.

Figure 11A:
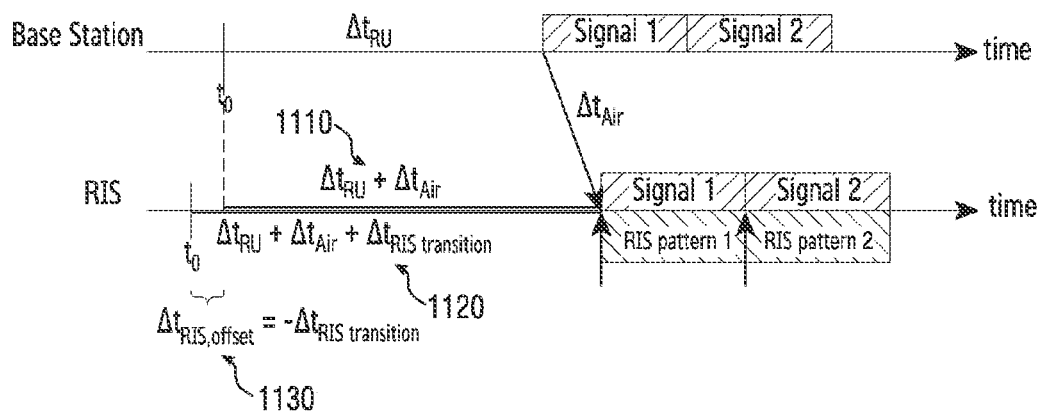
FIG. 11A illustrates an example of synchronizing an RIS pattern application time point when an RIS control signal is wirelessly received according to an embodiment.

FIG. 11A illustrates an example of synchronizing an RIS pattern application time point when an RIS control signal is wirelessly received according to an embodiment.

In case that the base station performs a command to wirelessly transmit the RIS control signal and data signal at the same time point to, the switching delay time of the RSI reflection pattern based on the control signal as described above may be further required. Accordingly, when the data signal reaches the RIS reflection plane, a beam pattern of a suitable reflection plane may not applied to each data signal. When the time points at which the processor of the DU transmits the two signals (e.g., the time points at which the command to transmit the two signals is executed) are the same, a delay time required to receive the control signal and switch the RIS reflection pattern occurs, and thus, the delay time 1120 of the control signal for applying the RIS reflection pattern may have a greater value than the delay time 1110 of the data signal. Accordingly, there may be an error time between the time point at which the data signal reaches the reflection plane and the time point at which the RC receives the control signal and application of the RIS reflection pattern is completed.

To transmit the data signal by applying an optimal RIS reflection pattern, the base station needs to synchronize the time point at which the data signal reaches the reflection plane and the time point at which the RIS reflection pattern is applied. The base station may apply a time offset 1130 when transmitting the control signal to the RC. That is, the base station may apply the time offset 1130 corresponding to the error time between the data signal transmission time point and the control signal transmission time point and transmit the two signals, which may be referred to as an RIS offset $\Delta T_{RIS,Offset}$ 1130. As shown in FIG. 11A, when the RIS offset 1130 is applied when the base station transmits the control signal, the time point at which the data signal reaches the reflection plane and the time point at which the RIS pattern is applied based on the control signal may be synchronized. The delay time of the control signal is larger when the control signal is wirelessly transmitted, and thus, the base station may transmit the control signal after the RIS offset 1130 from the time point at which the control signal is transmitted to synchronize the application time points of the two signals.

After transmitting the control signal, the base station may transmit the data signal at the time point at which RIS offset is applied, and may determine the beam switching slot shown in FIG. 9B for more accurate timing synchronization and transmit the data signal including the determined beam switching slot as well.

Figure 11B:
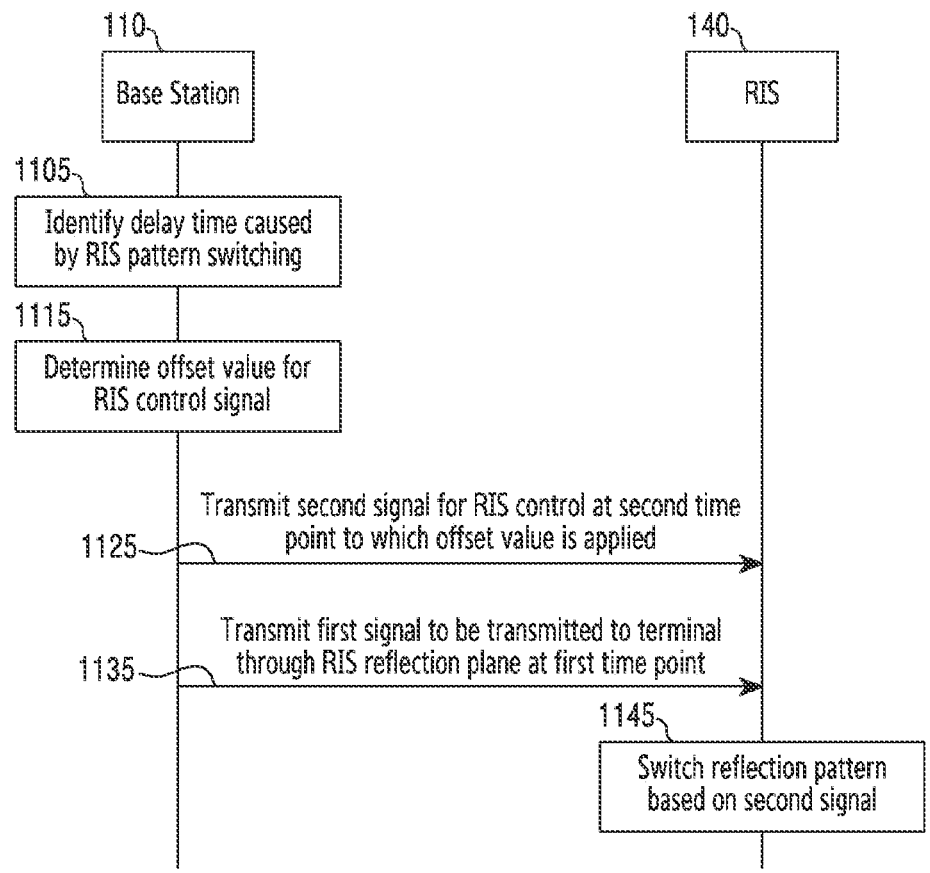
FIG. 11B illustrates a signal flow for synchronizing an RIS pattern application time point when an RIS control signal is wirelessly received according to an embodiment.

FIG. 11B illustrates a signal flow for synchronizing an RIS pattern application time point when an RIS control signal is wirelessly received according to an embodiment. The base station in FIG. 11B may include the processor of the DU included in the base station.

In step 1105, the base station may identify a delay time caused by RIS pattern switching, which may include a time required for processing the control signal of the RIS processor or a time required for the RC to receive the control signal and then switch the RIS reflection plane. The base station may transmit or receive a message for requesting information for the RIS pattern switching delay time or a message for identification to or from the RC according to a predetermined period and may identify information for the RIS pattern switching delay time.

In step 1115, the base station may determine an offset value for the RIS control signal, which value may correspond to the error time between the transmission time point of the data signal and the transmission time point of the control signal. The offset value for the RIS control signal may include an RIS offset. A time required until the time point at which the RIS reflection pattern is switched after the DU processor transmits the control signal to the RC may be $\Delta t_{RU} + \Delta t_{Air} + \Delta t_{RIS\ transition}$. A time required until the time point at which the data signal reaches the RIS reflection plane (panel) after the DU processor transmit the control signal to be transmitted toward the RIS reflection plane may be $\Delta t_{RU} + \Delta t_{Air}$. Accordingly, the base station may determine the RIS offset as $\Delta t_{RIS\ transition}$, which corresponds to a difference between delay times of the two signals. $\Delta t_{Air}$ may indicate the air delay time and may be determined based on the distance between the RU antenna and the RIS reflection plane. $\Delta t_{RIS\ transition}$ may indicate the switching delay time and may be determined based on a voltage change of a PIN diode connected to the RIS. $\Delta t_{RU}$ may indicate the RU delay time and may be determined by a value of the delay time elapsed in the buffer of the RU. Herein, the RU delay time may indicate a delay time elapsed in the buffer of the RU. Among elements for determining the offset value described above, $\Delta t_{Air}$, $\Delta t_{Wire}$, and $\Delta t_{RU}$ may have the same value because the control signal and the data signal are transmitted through the same wireless path, and thus the RIS offset may be determined based on $\Delta t_{RIS\ transition}$.

The base station may determine the RIS offset value based on the RIS pattern switching delay time having been identified in step 1105. The base station may apply the determined RIS offset value to control the control signal.

In step 1125, the base station may transmit the control signal for RIS control to the RC. The control signal to be transmitted from the base station to the RC may correspond to a signal for controlling the pattern of the RIS reflection plane. A predetermined delay time may occur from a time point at which the base station transmits the control signal to a time point at which the RC receives the control signal and applies the RIS reflection pattern based thereon. The delay time (e.g., the delay time of the control signal) occurring from the transmission time point of the control signal to the switching time point of the RIS reflection pattern may correspond to a sum of the RU delay time, the air delay time, and the RIS switching delay time.

In step 1135, the base station may transmit the data signal to be transmitted to the terminal through the RIS reflection plane. The data signal transmitted to the RIS reflection plane by the base station may correspond to a signal transmitted to the terminal which is positioned in a radio shadow area. The base station may transmit the RIS data signal at the time point at which the RIS offset having been determined in step 1115 is applied. To be distinguished from the control signal transmitted to the RC by the base station, the data signal is described as a data signal for convenience and may include all signals (e.g., the data signal, the control signal, and the like) for communication with the terminal A predetermined delay time may occur from a time point at which the base station transmits the data signal to a time point at which the RIS reflection plane receives the data signal (e.g., the time point of reflection toward the terminal). The delay time of the data signal occurring in transmission and reception of the data signal may correspond to a sum of the RU delay time and the air delay time. The delay time of the control signal may include the RIS pattern switching delay time in addition to the delay time of the data signal. Thus, the delay time of the control signal may be larger than the delay time of the control signal. Accordingly, to synchronize the reception time point of the data signal and the switching time point of the RIS reflection pattern, the base station may transmit the data signal after the determined RIS offset value from the time point of transmitting the control signal.

In step 1145, the RIS may apply (e.g., switch) the reflection pattern based on the control signal received from the base station. Specifically, the RC may control the RIS reflection pattern to be produced based on the control signal received from the base station. As such, the time point at which the RIS receives the data signal from the base station may be the same as the time point at which the RIS applies (e.g., performs RIS element adjustment according to a beam pattern) the RIS reflection pattern based on the control signal. The time point at which the RIS reflection plane receives, from the base station, the data signal transmitted after the RIS offset from the time point at which the base station transmits the control signal and the time point at which the RIS reflection pattern is applied based on the control signal transmitted by the base station may be the same. Accordingly, the RIS may reflect the data signal to the terminal based on the switched RIS reflection pattern.

As such, when the base station is wirelessly connected to the RC, the RC may apply an appropriate RIS reflection pattern to the data signal to be reflected to the terminal at an optimal time point. In addition, even when wirelessly transmitting the control signal, the respective operations may be combined for compensating for the uncertainty shown in FIG. 9B. For example, after transmitting the control signal, the base station may transmit the data signal at the time point at which RIS offset is applied and in addition thereto, may determine the beam switching slot shown in FIG. 9B for more accurate timing synchronization and transmit the data signal including the determined beam switching slot as well.

Figure 12A:
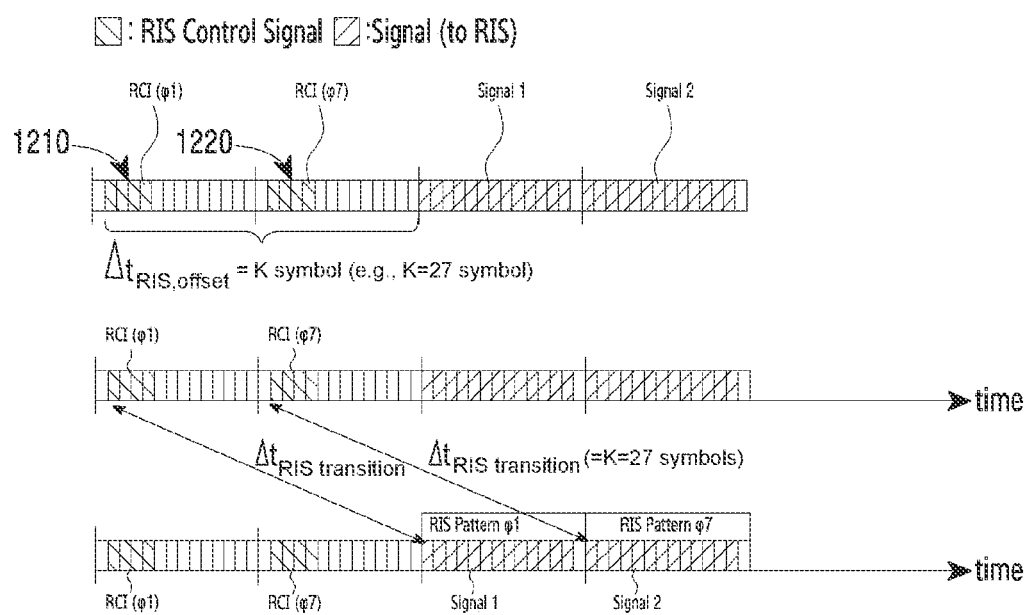
FIG. 12A illustrates an example of transmitting or receiving a control signal including RIS control information (RCI) when an RIS control signal is wirelessly received according to an embodiment.

FIG. 12A illustrates an example of transmitting or receiving a control signal including RCI when an RIS control signal is wirelessly received according to an embodiment.

As shown in FIG. 10 to FIG. 11B, to transmit the data signal by applying an optimal RIS reflection pattern, the base station needs to synchronize the time point at which the data signal reaches the reflection plane and the time point at which the RIS reflection pattern is applied. The base station may apply a time offset when transmitting the control signal to the RC, i.e., corresponding to the error time between the data signal transmission time point and the control signal transmission time point and transmit the two signals. The time offset applied to transmission of the control signal by the base station may be referred to as an RIS offset $\Delta T_{RIS, Offset}$. The delay time of the control signal is larger when the control signal is wirelessly transmitted. Thus, the base station may transmit the control signal after the RIS offset from the time point at which the control signal is transmitted to synchronize the application time points of the two signals.

Referring to FIG. 12A, the RC having received the control signal from the base station may include a resource for a symbol corresponding to the RIS offset which is the delay time for RIS pattern switching before the RIS reflection plane receives the data signal. The control signal transmitted by the base station may include RCI 1210 or 1220. For example, the base station may include the RCI 1210 or 1220 into a symbol duration corresponding to the RIS offset and transmit same to the RC. The RCI 1210 or 1220 transmitted by the base station may include an index for one or more RIS beams which the RC needs to apply, which index may correspond to each RIS reflection pattern.

As shown in FIG. 12A, the control signal may include K symbols corresponding to the RIS offset duration. The control signal may include a control signal including the RCI 1210 or 1220 within the K symbols, and each RCI 1210 or 1220 may be decoded before the time point at which the RIS reflection pattern is applied and may indicate the RIS reflection pattern corresponding to each data signal. For example, the RC may decode the RCI and identify the beam index and may perform an operation of switching into a reflection pattern corresponding to the beam index of the RCI after the RIS offset from the time point of receiving the RCI 1210 or 1220. Although it is described that the RIS pattern corresponding to the RCI is applied from the symbol after K symbols corresponding to the offset duration from the first symbol among symbols for the RCI included in the control signal received by the RC, the disclosure is not limited thereto. For example, regardless of the decoding time of the RC, a first symbol among symbols for the RCI may be a reference symbol, or one of symbols for the RCI may be configured as a reference symbol and the corresponding RIS pattern may be applied from the symbol corresponding to the offset duration from the reference symbol.

Even when wirelessly transmitting the control signal, of course, the respective operations may be combined for compensating for the uncertainty shown in FIG. 9B. For example, after transmitting the control signal including the RCI, the base station may transmit the data signal at the time point at which RIS offset is applied, and may determine the beam switching slot shown in FIG. 9B for more accurate timing synchronization and transmit the data signal including the determined beam switching slot.

Figure 12B:
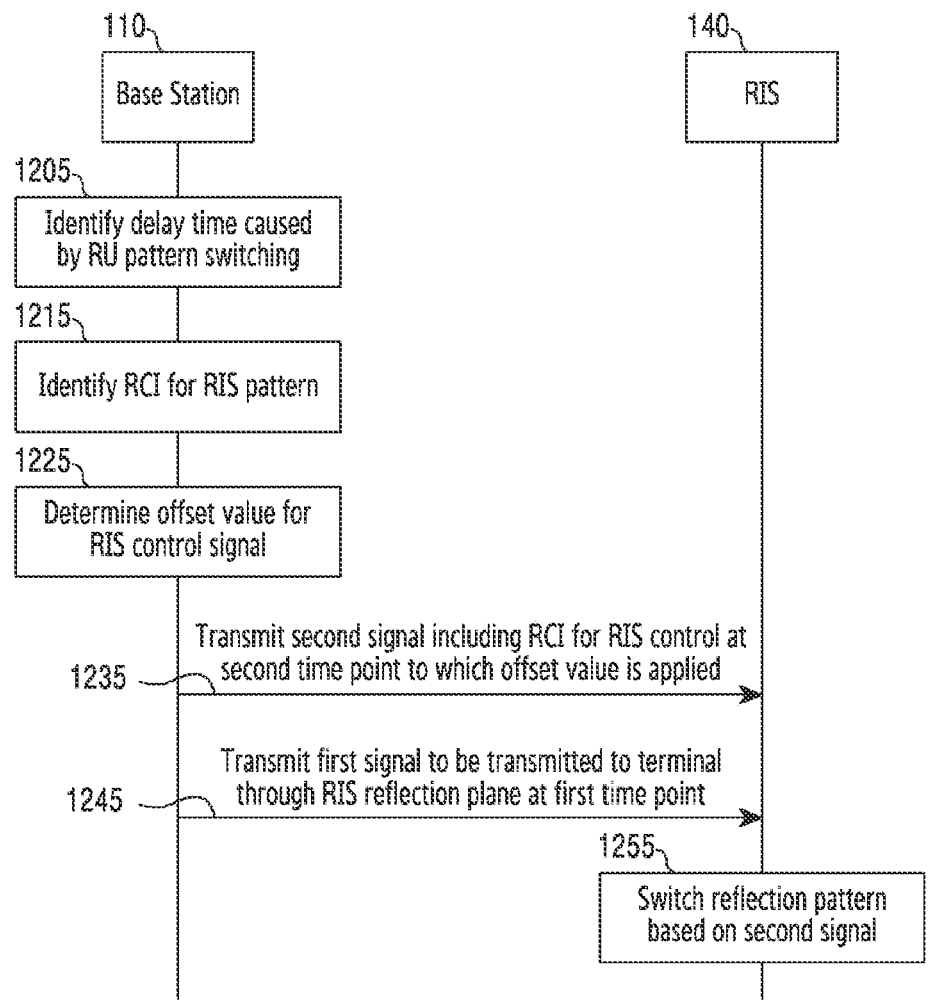
FIG. 12B illustrates a signal flow for transmitting or receiving a control signal including RCI when an RIS control signal is wirelessly received according to an embodiment.

FIG. 12B illustrates a signal flow for transmitting or receiving a control signal including RCI when an RIS control signal is wirelessly received according to an embodiment. The base station in FIG. 12B may include the processor of the DU included in the base station.

Referring to FIG. 12B, in step 1205, the base station may identify a delay time caused by RIS pattern switching. Specifically, the delay time caused by the RIS pattern switching may include a time required for processing the control signal of the RIS processor or a time required for the RC to receive the control signal and then switch the RIS reflection plane. The base station may transmit or receive a message for requesting information for the RIS pattern switching delay time or a message for identification to or from the RC according to a predetermined period and may identify information for the RIS pattern switching delay time.

In step 1215, the base station may identify RCI for the RIS reflection pattern. The RIS control signal transmitted to the RC by the base station may be transmitted through the RIS control channel and may include the RCI. The RCI may include an index for the RIS beam which the RIC controller needs to apply. The base station may identify the RIS reflection pattern corresponding to each data signal based on the data signal transmitted to the terminal through the RIS reflection plane and identify the RCI based on the identified RIS reflection pattern. A physical signal of the control signal transmitted by the base station may adopt a correlation-based detection technique including sequences such as a Zadoff-Chu sequence, a computer-generated (CG) sequence, or a pseudo-random noise (PN) sequence for fast decoding of the RC and application of the RIS reflection pattern. The base station may include the RCI in the control signal based on a root index value or a cyclic shift value of each sequence. The Zadoff-Chu sequence may refer to a mathematical sequence of complex-valued values that, when applied to a signal, generates a new signal of constant amplitude, and the PN sequence may refer to a sequence generating a signal through pseudo-random noise in encryption.

The base station may apply the RCI based on the size of the RIS beam book including the RIS reflection pattern and the number of symbols of the offset value for the RIS control signal. For example, when the RIS beam book has a size of 16, the base station may map the RCI and the RIS reflection pattern to the RIS beam index by using log 2(16)=4 bits. Alternatively, the base station may apply bit information of the RCI as the cyclic shift (CS) value of the Zadoff-Chu sequence to generate the control signal. The base station may transmit the control signal to the RC by including the control signal before the data signal corresponding to the beam index of the corresponding RCI by the number of symbols of the RIS offset value.

In step 1225, the base station may determine an offset value for the RIS control signal. The offset value for the RIS control signal may be a value corresponding to the error time between the transmission time point of the data signal and the transmission time point of the control signal. The offset value for the RIS control signal may include an RIS offset. A time required to the time point at which the RIS reflection pattern is switched after the DU processor transmits the control signal to the RC may be $\Delta t_{RU}+\Delta t_{Air}+\Delta t_{RIS\ transition}$. A time required to the time point at which the data signal reaches the RIS reflection plane (panel) after the DU processor transmit the control signal to be transmitted toward the RIS reflection plane may be $\Delta t_{RU}+\Delta t_{Air}$. Accordingly, the base station may determine the RIS offset as $\Delta t_{RIS\ transition}$, which corresponds to a difference between delay times of the two signals.

$\Delta t_{Air}$ may indicate the air delay time and may be determined based on the distance between the RU antenna and the RIS reflection plane. $\Delta t_{RIS\ transition}$ may indicate the switching delay time and may be determined based on a voltage change of a PIN diode connected to the RIS. $\Delta t_{RU}$ may indicate the RU delay time and may be determined by a value of the delay time elapsed in the buffer of the RU. Accordingly, the RU delay time may mean a delay time elapsed in the buffer of the RU. Among elements for determining the offset value described above, $\Delta t_{Air}$, $\Delta t_{Wire}$, and $\Delta t_{RU}$ may have the same value because the control signal and the data signal are transmitted through the same wireless path, and thus the RIS offset may be determined based on $\Delta t_{RIS\ transition}$.

The base station may determine the RIS offset value based on the RIS pattern switching delay time having been identified in step 1205. The base station may apply the determined RIS offset value to control the control signal.

In step 1235, the base station may transmit the control signal for RIS control to the RC, which control signal may correspond to a signal for controlling the pattern of the RIS reflection plane. A predetermined delay time may occur from a time point at which the base station transmits the control signal to a time point at which the RC receives the control signal and applies the RIS reflection pattern based thereon. The delay time of the control signal occurring from the transmission time point of the control signal to the switching time point of the RIS reflection pattern may correspond to a sum of the RU delay time, the air delay time, and the RIS switching delay time.

In step 1245, the base station may transmit the data signal to be transmitted to the terminal through the RIS reflection plane. The data signal transmitted to the RIS reflection plane by the base station may correspond to a signal transmitted to the terminal which is positioned in a radio shadow area. The base station may transmit the RIS data signal at the time point at which the RIS offset having been determined in step 1225 is applied. To be distinguished from the control signal transmitted to the RC by the base station, the data signal is described as a data signal for convenience and may include all signals (e.g., the data signal, the control signal, and the like) for communication with the terminal A predetermined delay time may occur from a time point at which the base station transmits the data signal to a time point at which the RIS reflection plane receives the data signal (e.g., the time point of reflection toward the terminal). The delay time of the data signal occurring in transmission and reception of the data signal may correspond to a sum of the RU delay time and the air delay time. The delay time of the control signal may include the RIS pattern switching delay time in addition to the delay time of the data signal and thus the delay time of the control signal may be larger than the delay time of the control signal. Accordingly, in order to synchronize the reception time point of the data signal and the switching time point of the RIS reflection pattern, the base station may transmit the data signal after the determined RIS offset value from the time point of transmitting the control signal.

In step 1255, the RIS may apply (e.g., switch) the reflection pattern based on the control signal received from the base station. Specifically, the RC may control the RIS reflection pattern to be produced based on the control signal received from the base station. The RIS may switch the RIS reflection pattern based on the RCI included in the control signal. As such, the time point at which the RIS receives the data signal from the base station may be the same as the time point at which the RIS applies (e.g., performs RIS element adjustment according to a beam pattern) the RIS reflection pattern based on the control signal. The time point at which the RIS reflection plane receives, from the base station, the data signal transmitted after the RIS offset from the time point at which the base station transmits the control signal and the time point at which the RIS reflection pattern is applied based on the control signal transmitted by the base station may be the same. Accordingly, the RIS may reflect the data signal to the terminal based on the switched RIS reflection pattern.

When the base station is wirelessly connected to the RC, the RC may receive the control signal including the information on the beam pattern and apply an appropriate RIS reflection pattern to the data signal to be reflected to the terminal at an optimal time point based on the control signal. In addition, the method may be performed by combining the respective operations for compensating for the uncertainty shown in FIG. 9B. For example, after transmitting the control signal, the base station may transmit the data signal at the time point at which RIS offset is applied and in addition thereto, may determine the beam switching slot shown in FIG. 9B for more accurate timing synchronization and transmit the data signal including the determined beam switching slot.

As described above, a method performed by a base station may include identifying a delay time caused by an RU buffer, determining an RIS offset value for synchronization of signals transmitted to a RIS, based on the delay time caused by the buffer, transmitting, to the RIS, a first signal to be transmitted to a terminal through a reflection plane of the RIS at a first time point, and transmitting, to the RIS, a second signal for controlling a reflection pattern of the RIS at a second time point to which the RIS offset value is applied.

The second time point to which the RIS offset value is applied may include a time point after the RIS offset value from the first time point.

In case that the RIS offset value is not applied to the second time point at which the second signal is transmitted, the method may further include transmitting the second signal for controlling the reflection pattern of the RIS to the RIS at the first time point, and the second signal may include information indicating to control the reflection pattern of the RIS after the RIS offset value from the time point at which the RIS receives the control signal.

The method may further include determining a slot for switching of the RIS reflection pattern and transmitting the first signal including the determined slot for the switching of the RIS reflection pattern to the RIS.

The slot for the switching of the RIS reflection pattern may be determined based on an error value of the delay time caused by the buffer in case that the error value of the delay time caused by the buffer exists.

The slot for the switching of the RIS reflection pattern may be determined based on a first delay time based on a maximum value of a size of the buffer and a second delay time based on a minimum value of a size of the buffer.

The method may further include identifying a delay time caused by switching of the reflection pattern of the RIS, the RIS offset value may be determined based on the identified delay time caused by the switching of the reflection pattern of the RIS, and the second time point to which the RIS offset value is applied may include a time point before the RIS offset value from the first time point.

The method may further include identifying RCI for the RIS reflection pattern corresponding to the first signal and transmitting the first signal including the RCI to the RIS at the first time point.

The RCI may be included in the first signal based on at least one of a Zadoff-Chu sequence, a CG sequence, or a pseudo-random noise (PN) sequence by a correlation-based detection.

The RIS offset value may be determined based on at least one of a distance between the RU antenna and the reflection plane of the RIS and a voltage change of a PIN diode connected to the reflection plane of the RIS.

According to various embodiments of the disclosure, in a wireless communication system, a base station may include at least one transceiver and at least one processor functionally connected to the at least one transceiver, wherein the at least one processor is configured to identify a delay time caused by an RU buffer, determine an RIS offset value for synchronization of signals transmitted to a RIS, based on the delay time caused by the buffer, transmit, to the RIS, a first signal to be transmitted to a terminal through a reflection plane of the RIS at a first time point, and transmit, to the RIS, a second signal for controlling a reflection pattern of the RIS at a second time point to which the RIS offset value is applied.

The second time point to which the RIS offset value is applied may include a time point after the RIS offset value from the first time point.

In case that the RIS offset value is not applied to the second time point at which the second signal is transmitted, the at least one processor may be further configured to transmit the second signal for controlling the reflection pattern of the RIS to the RIS at the first time point, and the second signal may include information indicating to control the reflection pattern of the RIS after the RIS offset value from the time point at which the RIS receives the control signal.

The at least one processor may be further configured to determine a slot for switching of the RIS reflection pattern and transmit the first signal including the determined slot for the switching of the RIS reflection pattern.

The slot for the switching of the RIS reflection pattern may be determined based on an error value of the delay time caused by the buffer in case that the error value of the delay time caused by the buffer exists.

The slot for the switching of the RIS reflection pattern may be determined based on a first delay time based on a maximum value of a size of the buffer and a second delay time based on a minimum value of a size of the buffer.

The at least one processor may be further configured to identify a delay time caused by switching of the reflection pattern of the RIS, the RIS offset value may be determined based on the identified delay time caused by the switching of the reflection pattern of the RIS, and the second time point to which the RIS offset value is applied may include a time point before the RIS offset value from the first time point.

The at least one processor may be further configured to identify RSI control information (RCI) for the RIS reflection pattern corresponding to the first signal and transmit the first signal including the RCI to the RIS at the first time point.

The RCI may be included in the first signal based on at least one of a Zadoff-Chu sequence, a CG sequence, or a pseudo-random noise (PN) sequence by a correlation-based detection.

The RIS offset value may be determined based on at least one of a distance between the RU antenna and the reflection plane of the RIS and a voltage change of a PIN diode connected to the reflection plane of the RIS.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the programs may form a memory in which the program is stored. A plurality of such memories may be included in the electronic device.

The programs may be stored in an attachable storage device which may access the electronic device through communication networks such as the Internet, Intranet, local area network (LAN), Wide LAN (WLAN), and storage area network (SAN) or a combination thereof. Such a storage device may access the electronic device via an external port. A separate storage device on the communication network may access a portable electronic device.

While the disclosure has been illustrated and described with reference to various embodiments of the present disclosure, those skilled in the art will understand that various changes can be made in form and detail without departing from the spirit and scope of the present disclosure as defined by the appended claims and their equivalents.

What is claimed is:

1. A method performed by a base station in a wireless communication system, the method comprising:
   identifying a delay time caused by a radio unit (RU) buffer;
   determining a reconfigurable intelligent surface (RIS) offset value for synchronization of signals transmitted to an RIS, based on the delay time caused by the RU buffer;
   transmitting, to the RIS, a first signal to be transmitted to a terminal through a reflection plane of the RIS at a first time point; and
   transmitting, to the RIS, a second signal for controlling a reflection pattern of the RIS at a second time point to which the RIS offset value is applied.

2. The method of claim 1,
wherein the second time point to which the RIS offset value is applied comprises a time point after the RIS offset value from the first time point.

3. The method of claim 1, further comprising, in case that the RIS offset value is not applied to the second time point at which the second signal is transmitted, transmitting the second signal for controlling the reflection pattern of the RIS to the RIS at the first time point,
wherein the second signal comprises information indicating to control the reflection pattern of the RIS after the RIS offset value from the time point at which the RIS receives the control signal.

4. The method of claim 1, further comprising:
determining a slot for switching the RIS reflection pattern; and
transmitting the first signal including the determined slot for switching the RIS reflection pattern to the RIS.

5. The method of claim 4,
wherein the slot for switching the RIS reflection pattern is determined based on an error value of the delay time caused by the buffer in case that the error value of the delay time caused by the buffer exists.

6. The method of claim 4,
wherein the slot for switching the RIS reflection pattern is determined based on a first delay time indicating a maximum value of a size of the buffer and a second delay time indicating a minimum value of a size of the buffer.

7. The method of claim 1, further comprising identifying a delay time caused by switching of the reflection pattern of the RIS,
wherein the RIS offset value is determined based on the identified delay time caused by switching the reflection pattern of the RIS, and
wherein the second time point to which the RIS offset value is applied comprises a time point before the RIS offset value from the first time point.

8. The method of claim 7, further comprising:
identifying RSI control information (RCI) for the RIS reflection pattern corresponding to the first signal; and
transmitting the first signal including the RCI to the RIS at the first time point.

9. The method of claim 8,
wherein the RCI is included in the first signal based on at least one of a Zadoff-Chu sequence, a computer-generated (CG) sequence, or a pseudo-random noise (PN) sequence by a correlation-based detection.

10. The method of claim 1,
wherein the RIS offset value is determined based on at least one of a distance between the RU antenna and the reflection plane of the RIS and a voltage change of a pin diode connected to the reflection plane of the RIS.

11. A base station in a wireless communication system, the base station comprising:
a transceiver; and
a controller coupled with the transceiver, and configured to:
identify a delay time caused by a radio unit (RU) buffer,
determine a reconfigurable intelligent surface (RIS) offset value for synchronization of signals transmitted to an RIS, based on the delay time caused by the RU buffer,
transmit, to the RIS, a first signal to be transmitted to a terminal through a reflection plane of the RIS at a first time point, and
transmit, to the RIS, a second signal for controlling a reflection pattern of the RIS at a second time point to which the RIS offset value is applied.

12. The base station of claim 11,
wherein the second time point to which the RIS offset value is applied comprises a time point after the RIS offset value from the first time point.

13. The base station of claim 11,
wherein, in case that the RIS offset value is not applied to the second time point at which the second signal is transmitted, the at least one processor is further configured to transmit the second signal for controlling the reflection pattern of the RIS to the RIS at the first time point, and
wherein the second signal comprises information indicating to control the reflection pattern of the RIS after the RIS offset value from the time point at which the RIS receives the control signal.

14. The base station of claim 11, wherein the controller is further configured to:
determine a slot for switching the RIS reflection pattern; and
transmit the first signal including the determined slot for switching the RIS reflection pattern to the RIS.

15. The base station of claim 14,
wherein the slot for switching the RIS reflection pattern is determined based on an error value of the delay time caused by the buffer in case that the error value of the delay time caused by the buffer exists.

16. The base station of claim 14,
wherein the slot for switching the RIS reflection pattern is determined based on a first delay time indicating a maximum value of a size of the buffer and a second delay time indicating a minimum value of a size of the buffer.

17. The base station of claim 11, wherein the controller is further configured to identify a delay time caused by switching the reflection pattern of the RIS,
wherein the RIS offset value is determined based on the identified delay time caused by switching the reflection pattern of the RIS, and
wherein the second time point to which the RIS offset value is applied comprises a time point before the RIS offset value from the first time point.

18. The base station of claim 17, wherein the controller is further configured to:
identify RSI control information (RCI) for the RIS reflection pattern corresponding to the first signal; and
transmit the first signal including the RCI to the RIS at the first time point.

19. The base station of claim 18,
wherein the RCI is included in the first signal based on at least one of a Zadoff-Chu sequence, a computer-generated (CG) sequence, or a pseudo-random noise (PN) sequence by a correlation-based detection.

20. The base station of claim 11,
wherein the RIS offset value is determined based on at least one of a distance between the RU antenna and the reflection plane of the RIS and a voltage change of a pin diode connected to the reflection plane of the RIS.

* * * * *